(12) United States Patent
Ahn et al.

(10) Patent No.: US 12,546,812 B2
(45) Date of Patent: Feb. 10, 2026

(54) TEST DEVICE CAPABLE OF TESTING MICRO LED AND MANUFACTURING METHOD THEREOF

(71) Applicant: POINT ENGINEERING CO., LTD., Chungcheongnam-do (KR)

(72) Inventors: Bum Mo Ahn, Gyeonggi-do (KR); Seung Ho Park, Gyeonggi-do (KR); Young Heum Eom, Gyeonggi-do (KR)

(73) Assignee: POINT ENGINEERING CO., LTD., Chungcheongnam-do (KR)

( * ) Notice: Subject to any disclaimer, the term of this patent is extended or adjusted under 35 U.S.C. 154(b) by 168 days.

(21) Appl. No.: 18/485,252

(22) Filed: Oct. 11, 2023

(65) Prior Publication Data

US 2024/0118335 A1 Apr. 11, 2024

(30) Foreign Application Priority Data

Oct. 11, 2022 (KR) ........................ 10-2022-0129443

(51) Int. Cl.
*G01R 31/26* (2020.01)
*G01R 1/04* (2006.01)
*G01R 31/28* (2006.01)
*H01R 31/02* (2006.01)
*H05K 1/11* (2006.01)

(52) U.S. Cl.
CPC ....... *G01R 31/2635* (2013.01); *G01R 1/0416* (2013.01); *H05K 1/118* (2013.01); *H05K 2201/10106* (2013.01)

(58) Field of Classification Search
CPC ........ G01R 31/00; G01R 31/02; G01R 31/26; G01R 31/28; G01R 1/04; G01R 1/067; G01R 1/073; H05K 1/11
See application file for complete search history.

(56) References Cited

U.S. PATENT DOCUMENTS

| 9,842,782 | B2 | 12/2017 | Chen et al. | |
| 2002/0057099 | A1* | 5/2002 | Esashi | G01R 1/07371 324/754.07 |
| 2006/0094162 | A1* | 5/2006 | Yabushita | G01R 1/0735 438/118 |
| 2011/0043239 | A1* | 2/2011 | Tomita | H01R 13/2414 324/756.03 |

FOREIGN PATENT DOCUMENTS

KR 1019133550000 12/2018

* cited by examiner

*Primary Examiner* — Neel D Shah
(74) *Attorney, Agent, or Firm* — JCIPRNET

(57) ABSTRACT

Proposed are a test device and a manufacturing method of the test device capable of testing a test object that is provided with an electrode which has a size and/or a pitch distance ranging from 1 to 100 micrometers (μm).

10 Claims, 23 Drawing Sheets

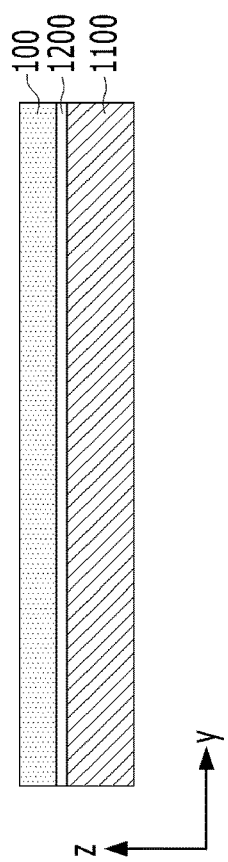
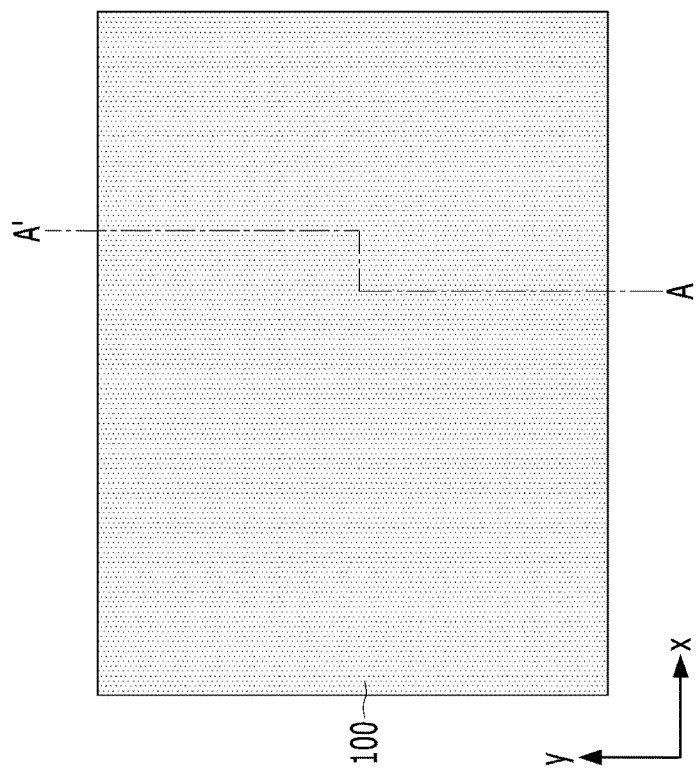
FIG. 9B
FIG. 9A

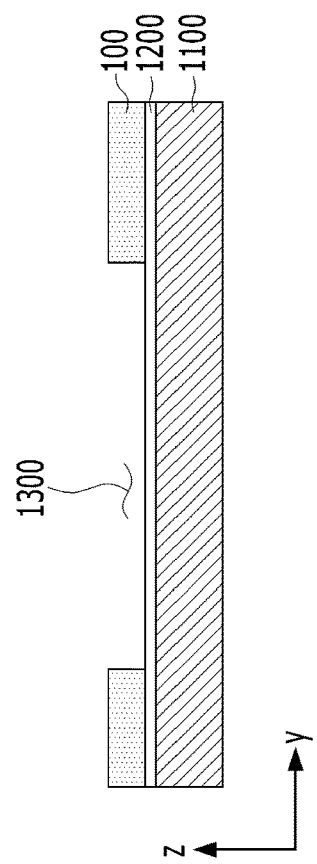
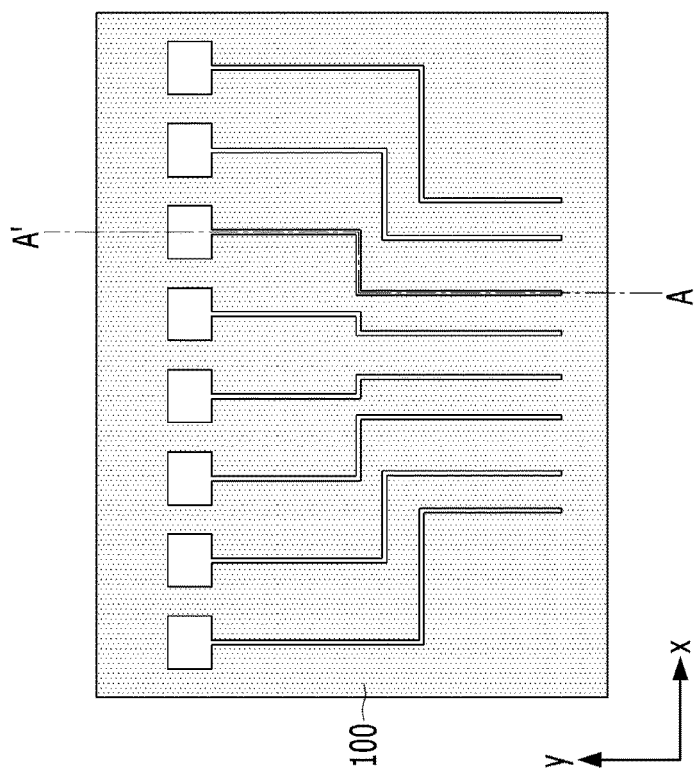
FIG. 10B
FIG. 10A

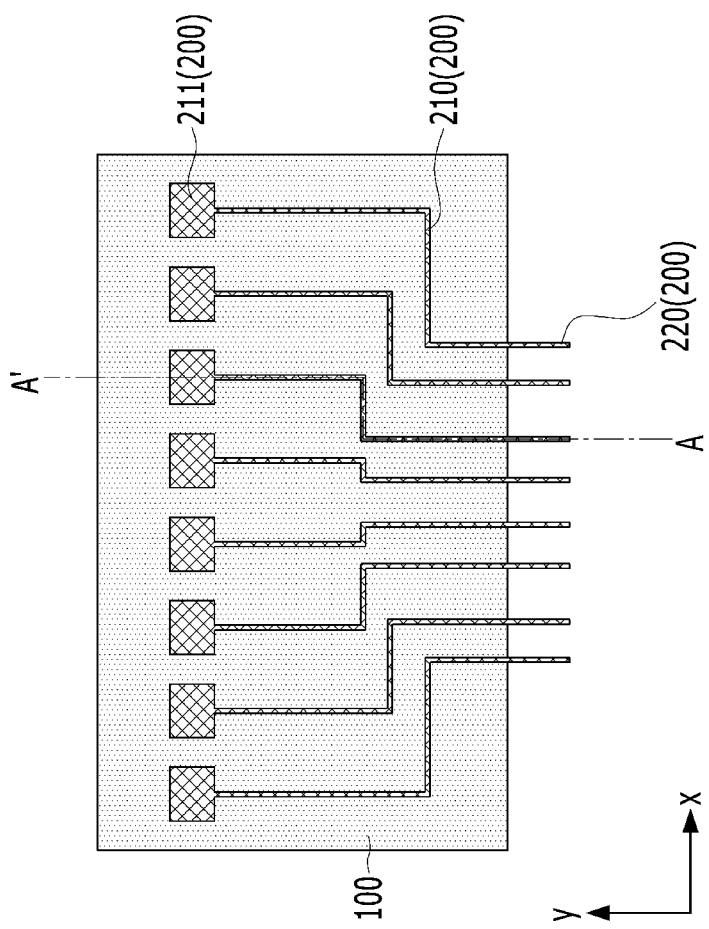
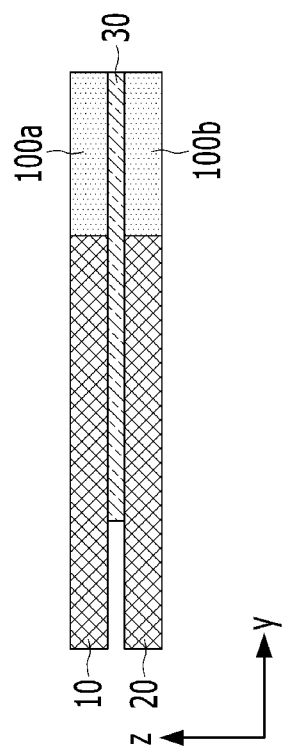
FIG. 13A
FIG. 13B

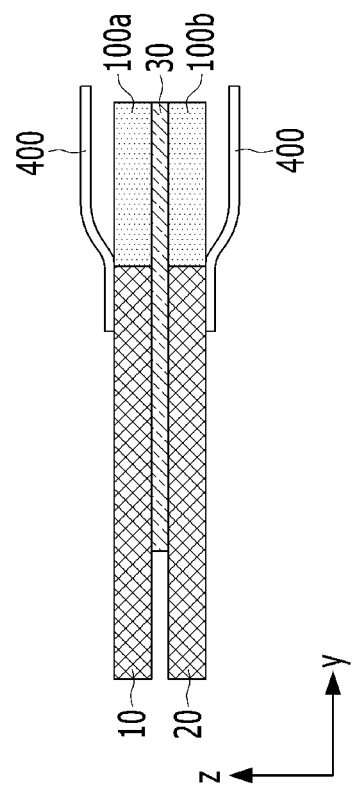
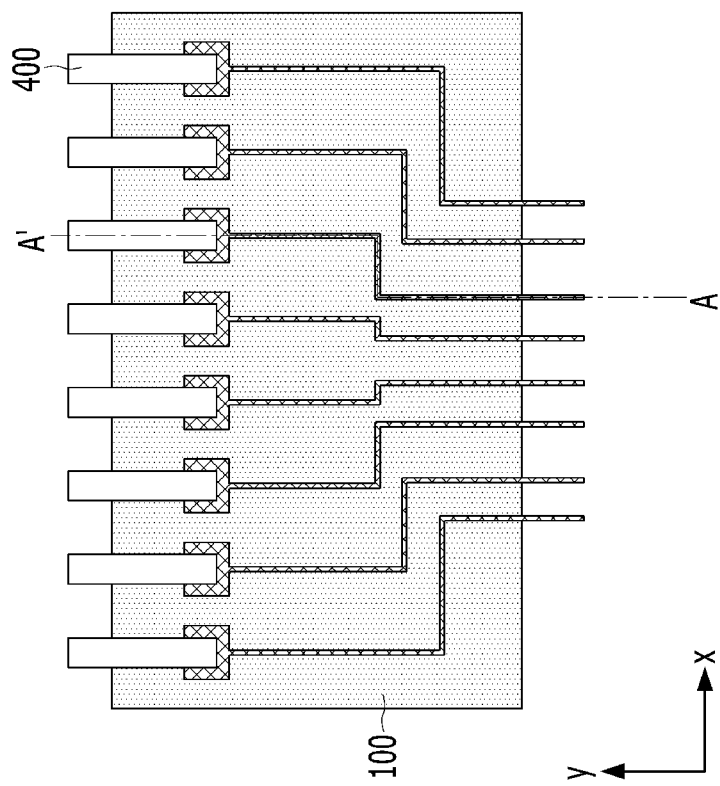
FIG. 14B
FIG. 14A

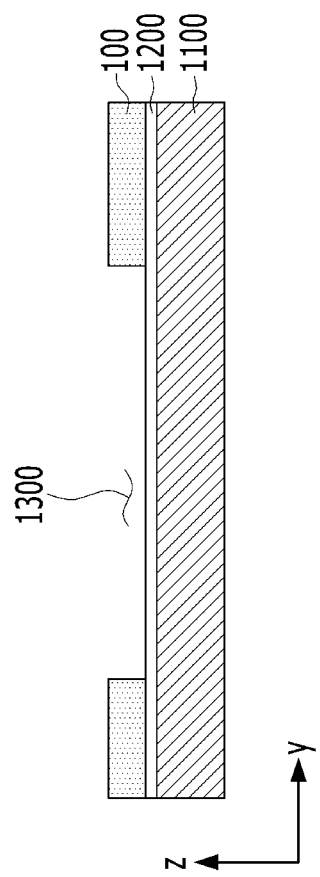
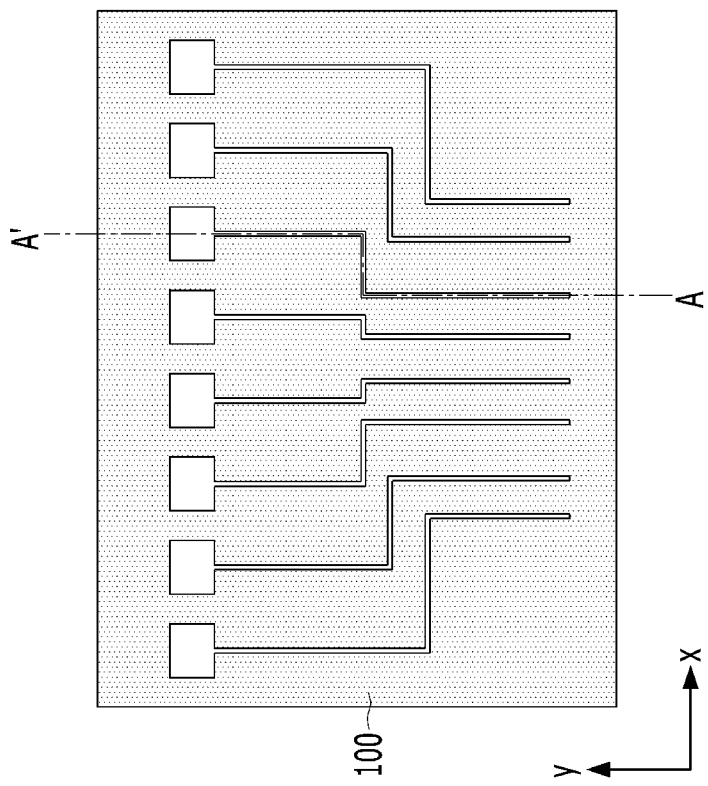
FIG. 16B
FIG. 16A

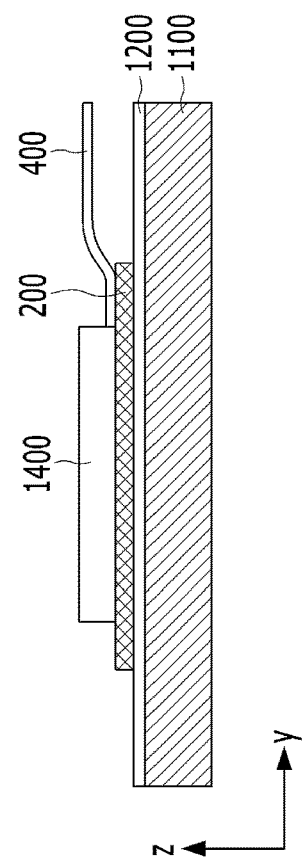
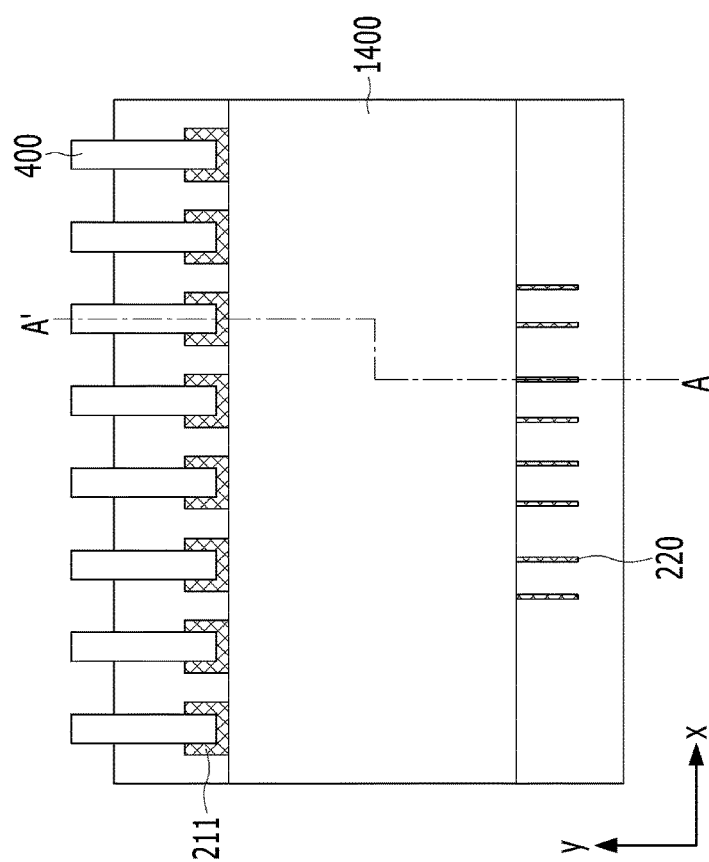
FIG. 20B
FIG. 20A

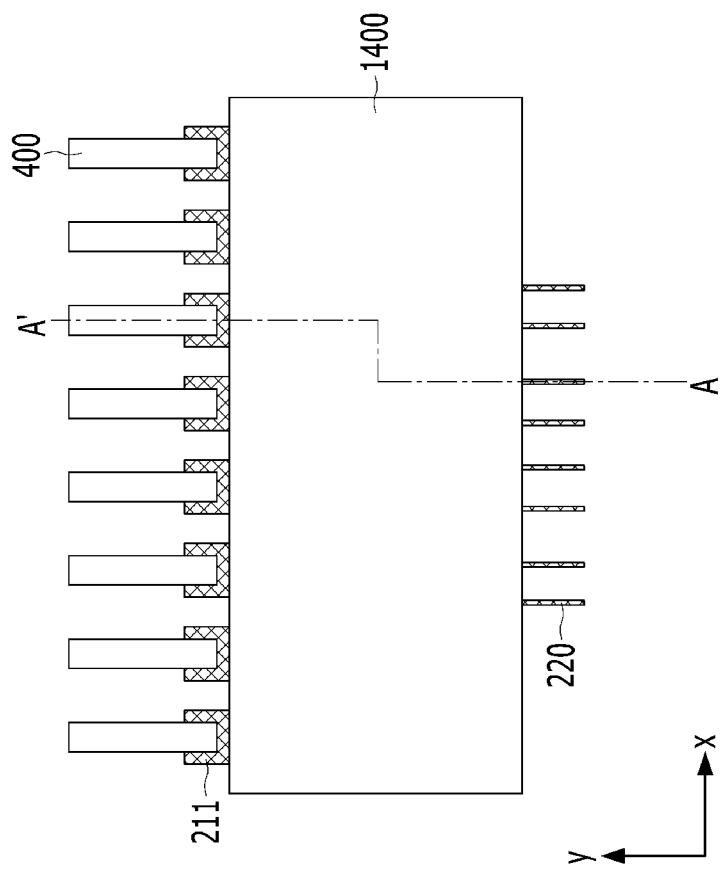
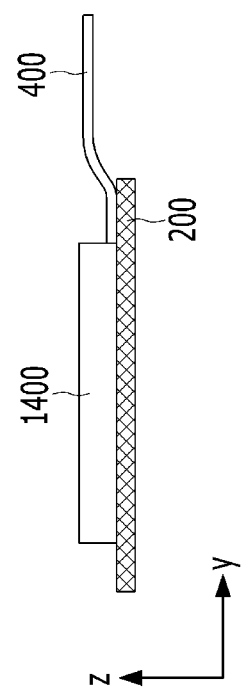
FIG. 21A
FIG. 21B

TEST DEVICE CAPABLE OF TESTING MICRO LED AND MANUFACTURING METHOD THEREOF

CROSS REFERENCE TO RELATED APPLICATION

The present application claims priority to Korean Patent Application No. 10-2022-0129443, filed Oct. 11, 2022, the entire contents of which are incorporated herein for all purposes by this reference.

BACKGROUND OF THE INVENTION

Field of the Invention

The present disclosure relates to a test device capable of testing a micro LED and a manufacturing method of the test device.

Description of the Related Art

A test device applies electricity to a test object and tests whether the test object is defective. The test object of the test device may include a semiconductor device, a memory chip, a microprocessor chip, a logic chip, a light emitting diode, or a combination thereof. For example, the test object includes a logic LSI (such as an ASIC, an FPGA, and an ASSP), a microprocessor (such as a CPU and a GPU), a memory (such as a DRAM, a Hybrid Memory Cube (HMC), a Magnetic RAM (MRAM), a Phase-Change Memory (PCM), a Resistive RAM (ReRAM), a Ferroelectric RAM (FeRAM), and a flash memory (NAND flash)), a semiconductor light emitting diode (including an LED, a mini LED, a micro LED, and so on), a power device, an analog IC (such as a DC-AC converter and an Insulated-Gate Bipolar Transistor (IGBT)), an MEMS (such as an acceleration sensor, a pressure sensor, a vibrator, and a gyro-sensor), a wireless device (such as a GPS, an FM, an NFC, an RFEM, an MMIC, and a WLAN), a discrete device, a BSI, a CIS, a camera module, a CMOS, a passive device, a GAW filter, an RF filter, an RF IPD, an APE, and a BB.

Recently, as the size of the test object is reduced, the size of an electrode of the test object is also reduced, and the pitch distance between the electrodes is also reduced. In order to respond to such a change in technology, a new type of test device is required to be proposed.

For example, recently, a micro LED display is emerging as another next-generation display. Core materials of an LCD and an OLED are liquid crystal and organic materials, respectively. However, the micro LED display is a display using a 1 to 100 micrometer (μm) unit LED chip as a light emitting material. The micro LED is being developed with an objective of having a horizontal size and a vertical size of 30 μm, respectively. Two electrodes are provided on an upper surface of the micro LED, and horizontal and vertical sizes of each electrode are 10 μm that is significantly small, and the pitch distance thereof is also about 10 μm that is significantly small.

In order to test such a micro LED, the size and the pitch of a contact pin is also required to be precisely manufactured to be about 10 μm. However, until now, no test device capable of reliably testing such a micro LED has been proposed.

DOCUMENT OF RELATED ART (Patent Document 1) U.S. Pat. No. 9,842,782
(Patent Document 2) Korean Patent No. 10-1913355

SUMMARY OF THE INVENTION

Accordingly, the present disclosure has been made keeping in mind the above problems occurring in the related art, and an objective of the present disclosure is to provide a test device and a manufacturing method of the test device capable of testing a test object that is provided with an electrode which has a size and/or a pitch distance ranging from 1 to 100 micrometers (μm).

In order to achieve the objective described above, there is provided a test device including: an insulation member having a flat plate shape; and a conductive part integrally provided with a wiring part that is provided inside the insulation member and with a connection part which is provided outside the insulation member and which is configured to be connected to a test object.

In addition, a thickness of the conductive part may be equal to or less than a thickness of the insulation member.

In addition, the insulation member may be an anodic oxide film in which a base metal is anodized and then the base metal is removed.

In addition, the insulation member may be a patternable material.

In addition, the connection part may include: a base end part connected to the wiring part; a tip end part in contact with the test object; and an elastic part elastically connecting the base end part and the tip end part to each other, thereby displacing the tip end part.

In addition, the connection part may further include a current pass part having a first end connected to the base end part and having a second end formed as a free end, and the current pass part may not be in contact with the tip end part when the elastic part is in an unpressed state, and the current pass part may be in contact with the tip end part when the elastic part is pressed.

In addition, the elastic part may be formed by alternately connecting a plurality of rectilinear parts and a plurality of curved parts to each other.

In addition, the conductive part may be provided such that a plurality of conductive parts is famed, the connection parts of the conductive parts adjacent to each other may include a first unit connection part and a second unit connection part that are having shapes left and right symmetrical with each other, and a pitch distance between a tip end part of the first unit connection part and a tip end part of the second unit connection part may be smaller than a pitch distance between a base end part of the first unit connection part and a base end part of the second unit connection part.

In addition, the connection part may include: a first unit connection part configured to be connected to a first electrode of the test object; and a second unit connection part configured to be connected to a second electrode of the test object, and the first unit connection part and the second unit connection part may have shapes left and right symmetrical with each other.

In addition, the wiring part may include a bonding pad to which a circuit part is bonded.

In addition, the conductive part may be provided with a plurality of conductive parts, and a pitch distance of the wiring parts at a side of the connection part may be smaller than a pitch distance of the wiring parts at a side of a bonding pad.

In addition, the test device may further include a reinforcement part having a metal material, the reinforcement part being not electrically connected to the conductive part, being provided inside the insulation member, and reinforcing a strength of the insulation member.

In addition, the insulation member may have a thickness of equal to or more than 10 μm and equal to or less than 200 μm.

Meanwhile, according to the present disclosure, there is provided a test device including: an insulation member having a flat plate shape in which an area of an x-y plane is larger than a thickness in a z-axis direction; and a conductive part having a thickness equal to or less than the thickness of the insulation member, the conductive part having a first portion mounted inside the insulation member and having a second portion that is positioned by extending outward to the insulation member.

Meanwhile, according to the present disclosure, there is provided a test device including: an insulation member having a flat plate shape that has a first surface of an x-y plane and a second surface of the x-y plane facing the first surface; and a conductive part having at least a portion provided between the first surface and the second surface such that the portion is positioned on a penetration part that extends inward from any one side portion of the insulation member, the conductive part having a remaining portion positioned by extending outward to the insulation member and being configured to be connected to a test object.

Meanwhile, according to the present disclosure, there is provided a test device including: a first unit member including a first insulation member having a flat plate shape, the first unit member including a first conductive part that is integrally provided with a first wiring part provided inside the first insulation member and with a first connection part which is provided outside the first insulation member and which is configured to be connected to a test object; a second unit member including a second insulation member having a flat plate shape, the second unit member including a second conductive part that is integrally provided with a second wiring part provided inside the second insulation member and with a second connection part which is provided outside the second insulation member and which is configured to be connected to the test object; and a bonding part bonding the first unit member and the second unit member to each other.

Meanwhile, according to the present disclosure, there is provided a manufacturing method of a test device, the manufacturing method including: a process of forming an inner space by removing a portion of an insulation member having a flat plate shape; a process of forming a conductive part by forming a metal layer in the inner space; and a process of exposing a portion of the conductive part by removing a portion of an end portion of the insulation member.

According to the present disclosure, the test device and the manufacturing method of the test device capable of testing a test object that is provided with an electrode which has a size and/or a pitch distance ranging from 1 to 100 micrometers (μm) are provided.

BRIEF DESCRIPTION OF THE DRAWINGS

The above and other objectives, features, and other advantages of the present disclosure will be more clearly understood from the following detailed description when taken in conjunction with the accompanying drawings, in which:

FIGS. 9A to 14B are views illustrating a first manufacturing method of the test device according to an exemplary embodiment of the present disclosure;

FIGS. 15A to 23B are views illustrating a second manufacturing method of the test device according to an exemplary embodiment of the present disclosure.

DETAILED DESCRIPTION OF THE INVENTION

Contents of the description below merely exemplify the principle of the present disclosure. Therefore, those of ordinary skill in the art may implement the theory of the present disclosure and invent various apparatuses which are included within the concept and the scope of the disclosure even though it is not clearly explained or illustrated in the description. Furthermore, in principle, all the conditional terms and embodiments listed in this description are clearly intended for the purpose of understanding the concept of the present disclosure, and one should understand that this disclosure is not limited to the exemplary embodiments and the conditions.

The above described objectives, features, and advantages will be more apparent through the following detailed description related to the accompanying drawings, and thus those of ordinary skill in the art may easily implement the technical spirit of the present disclosure.

The embodiments of the present disclosure will be described with reference to cross-sectional views and/or perspective views which schematically illustrate ideal embodiments of the present disclosure. For explicit and convenient description of the technical content, thicknesses and widths of films and regions in the figures may be exaggerated. Therefore, variations from the shapes of the illustrations as a result, for example, of manufacturing techniques and/or tolerances, are to be expected. Thus, the embodiments should not be construed as limited to the particular shapes of regions illustrated herein but are to include deviations in shapes that result, for example, from manufacturing. The teams used in the present specification are only used to describe specific embodiments, and are not intended to limit the present disclosure. Singular expressions include plural expressions unless the context clearly indicates otherwise. It will be further understood that the tams "comprises" or "have" used in this specification, specify the presence of stated features, steps, operations, components, parts, or a combination thereof, but do not preclude the presence or addition of one or more other features, numerals, steps, operations, components, parts, or a combination thereof.

Hereinafter, an exemplary embodiment of the present disclosure will be described in detail with reference to the accompanying drawings.

First Embodiment

Figure 1:
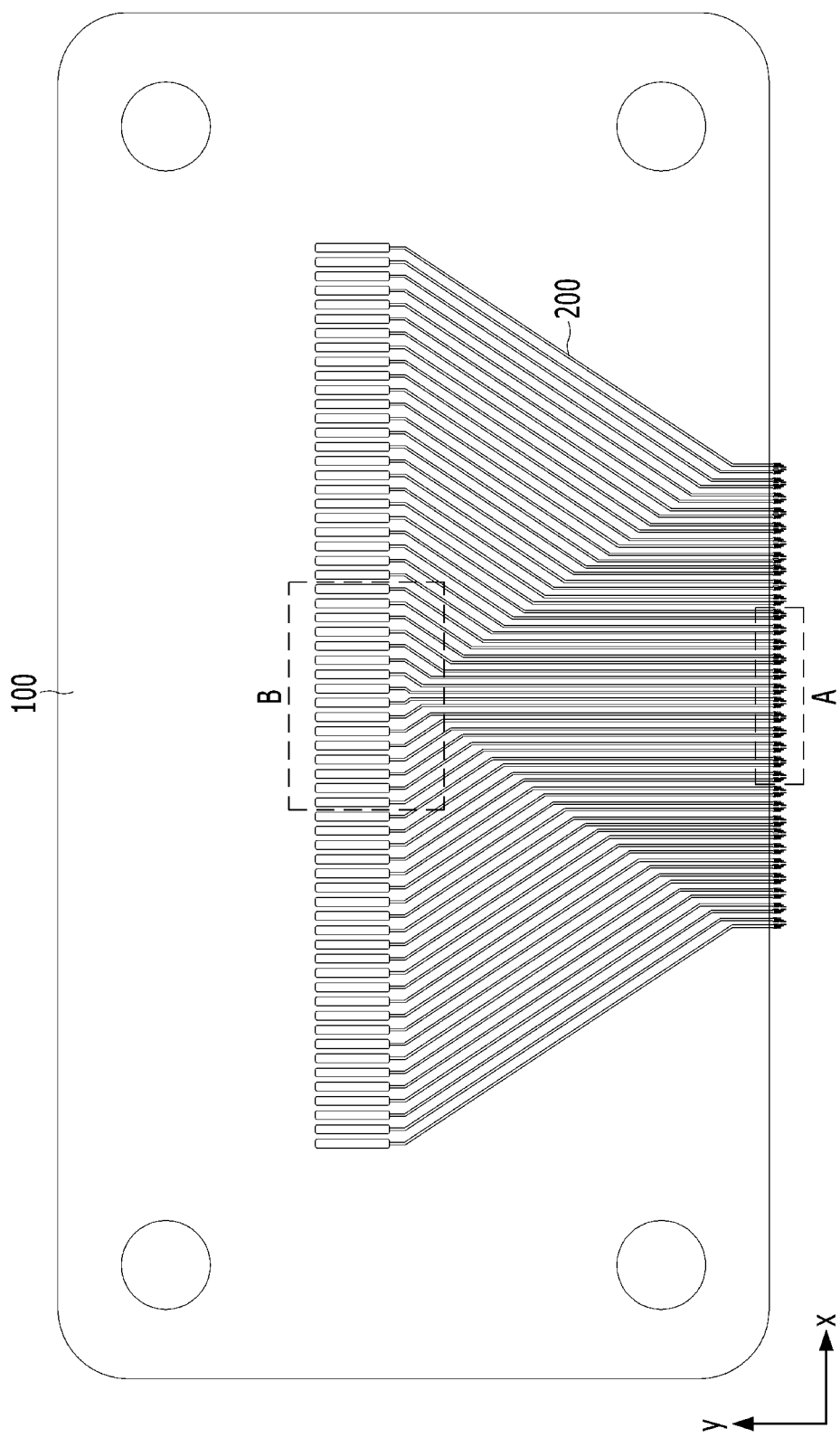
FIG. 1 is a plan view illustrating a test device according to an exemplary first embodiment of the present disclosure.
Figure 2:
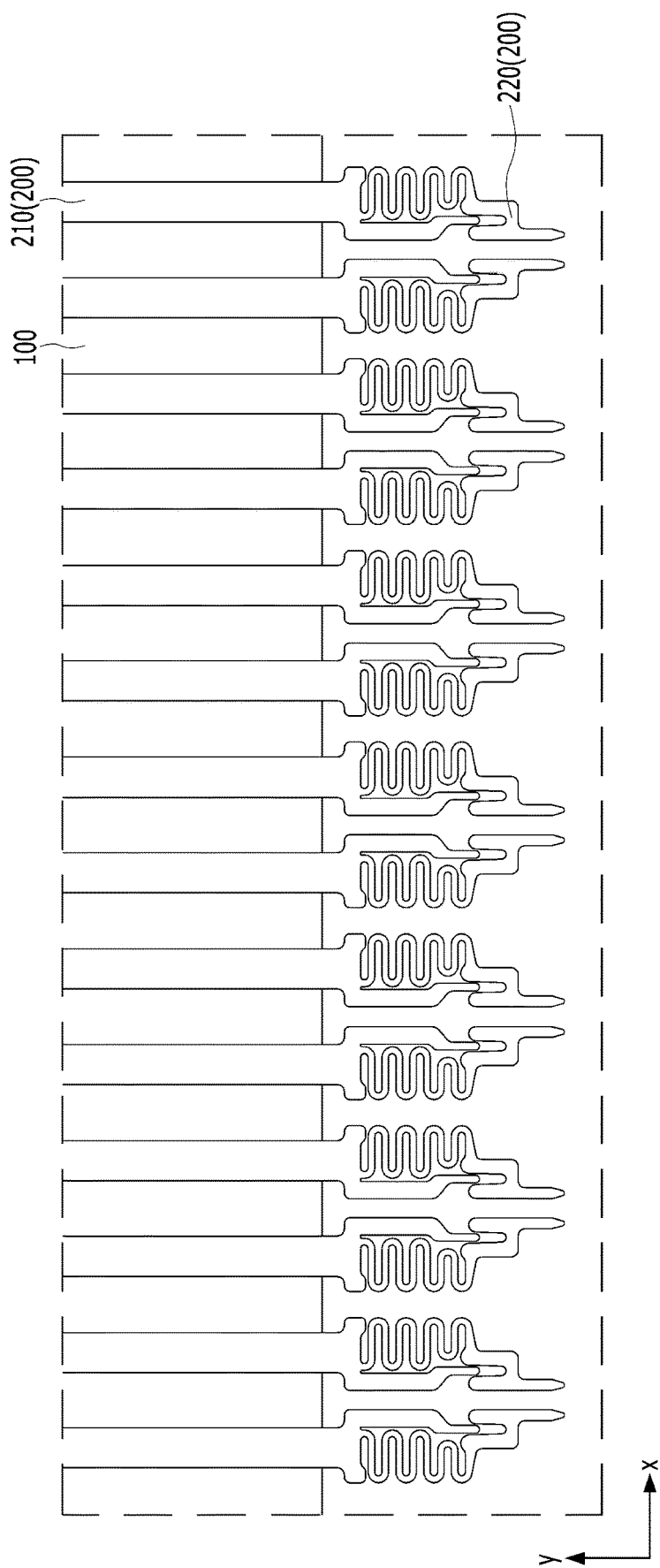
FIG. 2 is an enlarged view illustrating a portion A in FIG. 1.
Figure 3:
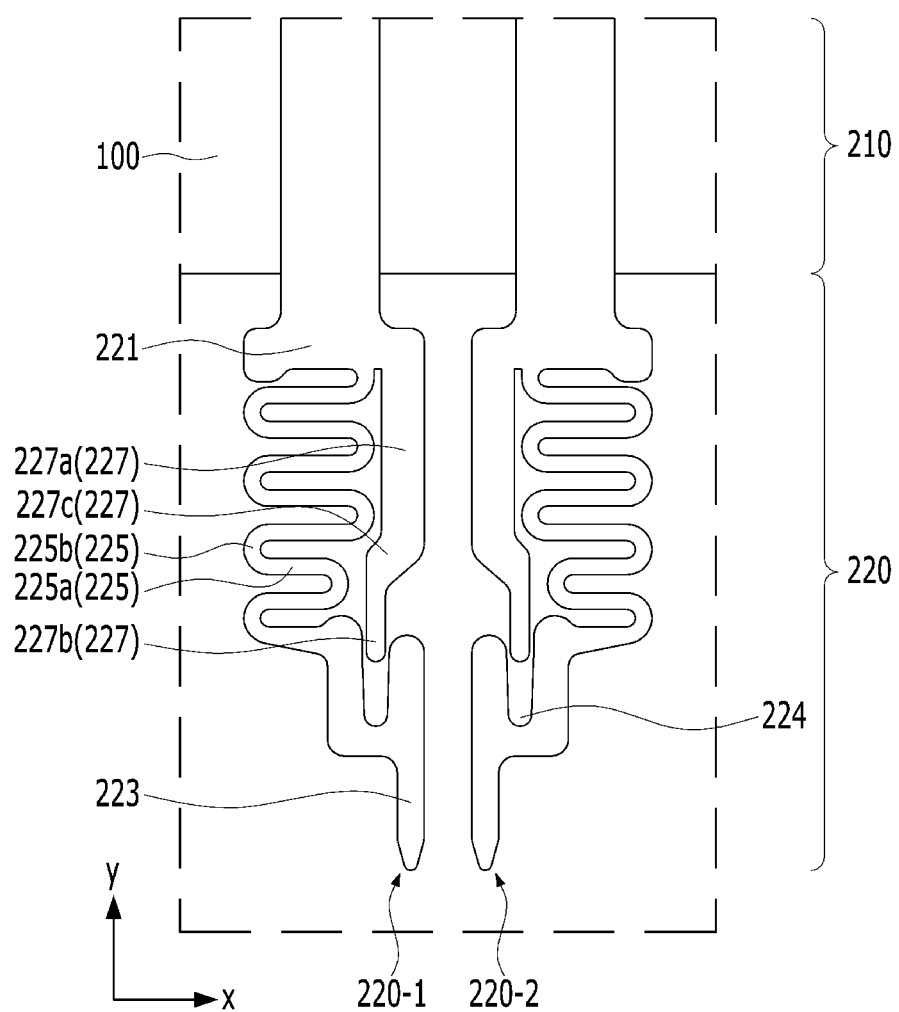
FIG. 3 is a view enlarging and illustrating a connection part in FIG. 2.
Figure 4:
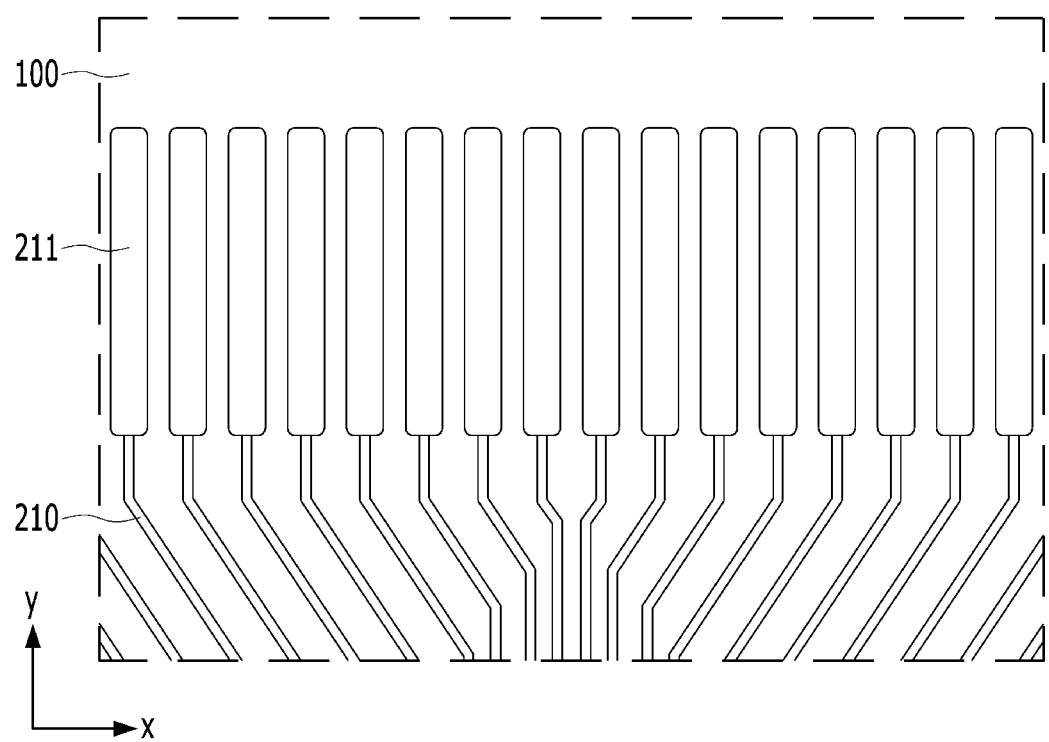
FIG. 4 is an enlarged view illustrating a portion B in FIG. 1.
Figure 5:
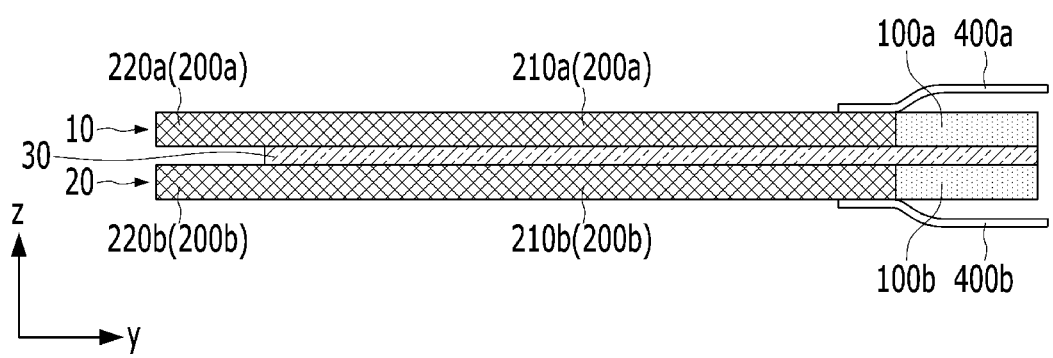
FIG. 5 is a cross-sectional view illustrating the test device according to the exemplary first embodiment of the present disclosure.
Figure 6:
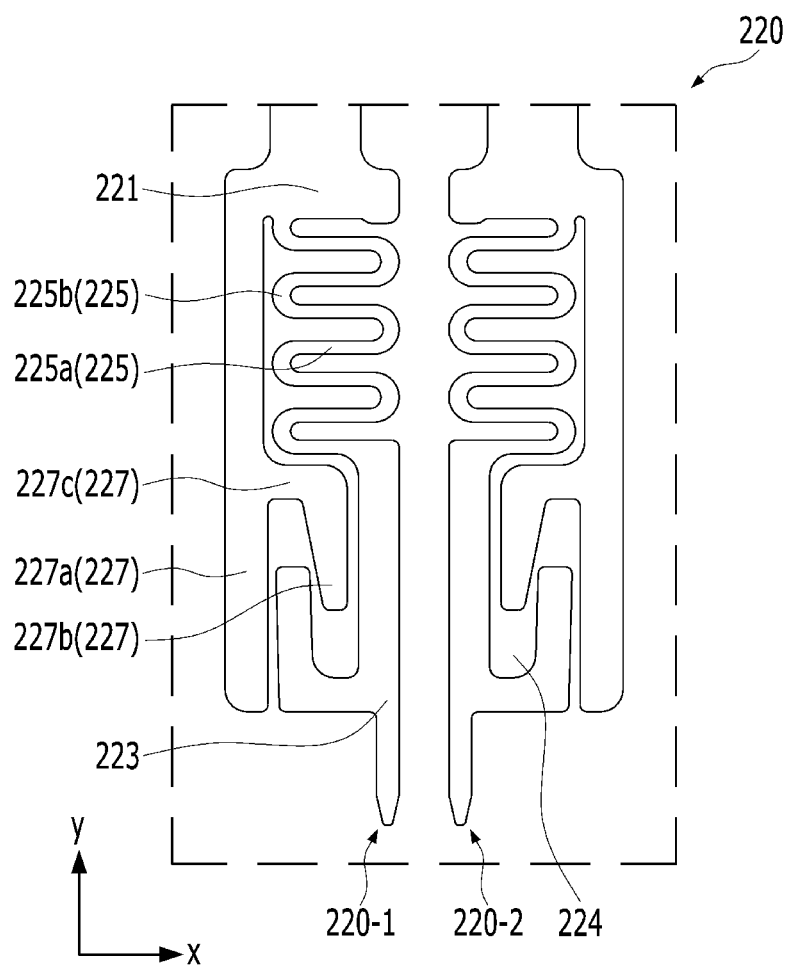
FIG. 6 is a view illustrating a modification example of the connection part of the test device of the exemplary first embodiment of the present disclosure.

FIG. 1 is a plan view illustrating a test device according to an exemplary first embodiment of the present disclosure, FIG. 2 is an enlarged view illustrating a portion A in FIG. 1, FIG. 3 is a view enlarging and illustrating a connection part in FIG. 2, FIG. 4 is an enlarged view illustrating a portion B in FIG. 1, FIG. 5 is a cross-sectional view illustrating the test device according to the exemplary first embodiment of the present disclosure, and FIG. 6 is a view illustrating a modification example of the connection part of the test device of the exemplary first embodiment of the present disclosure.

A test object 1 (illustrated in FIG. 8) of a test device may include a semiconductor device, a memory chip, a microprocessor chip, a logic chip, a light emitting diode, or a combination thereof. For example, the test object 1 may include a logic LSI (such as an ASIC, an FPGA, and an ASSP), a microprocessor (such as a CPU and a GPU), a memory (such as a DRAM, a Hybrid Memory Cube (HMC), a Magnetic RAM (MRAM), a Phase-Change Memory (PCM), a Resistive RAM (ReRAM), a Ferroelectric RAM (FeRAM), and a flash memory (NAND flash)), a semiconductor light emitting diode (including an LED, a mini LED, a micro LED, and so on), a power device, an analog IC (such as a DC-AC converter and an Insulated-Gate Bipolar Transistor (IGBT)), an MEMS (such as an acceleration sensor, a pressure sensor, a vibrator, and a gyro-sensor), a wireless device (such as a GPS, an FM, an NFC, an RELM, an MMIC, and a WLAN), a discrete device, a BSI, a CIS, a camera module, a CMOS, a passive device, a GAW filter, an RF filter, an RF IPD, an APE, and a BB.

For example, the test device may be a test device capable of testing a micro LED.

The test device includes an insulation member 100 and a conductive part 200.

The insulation member 100 is formed of an insulation material. The insulation material is formed of a patternable material. The patternable material includes a polymer material, a photo-resist material, an anodic aluminum oxidation film material, and so on.

Preferably, in consideration of the rigidity of the test device, the insulation member 100 may be formed of an anodic oxide film material in which a base metal is anodized and then the base metal is removed. The anodic oxide film refers to a film formed when the base metal is anodized, and pores refers to holes formed in a process of forming the anodic oxide film by anodizing the base metal. For example, when the base metal is aluminum (Al) or an aluminum alloy and when the base metal is anodized, the anodic oxide film having an aluminum oxide ($Al_2O_3$) material is formed on a surface of the base metal. However, the base metal is not limited thereto, and includes Ta, Nb, Ti, Zr, HF, Zn, W, SB, or an alloy thereof. The anodic oxide film formed as described above is divided vertically into a barrier layer in which pores are not formed therein and a porous layer in which pores are formed therein. In the base metal having the surface provided with the anodic oxide film that has the barrier layer and the porous layer, when the base metal is removed, the anodic oxide film having the aluminum oxide ($Al_2O_3$) material only remains. The anodic oxide film has a coefficient of thermal expansion of 2 ppm/° C. to 3 ppm/° C. As a result, there is less thermal deformation due to temperature. In addition, even if a test environment is a high temperature environment, a precise test is capable of being performed without thermal deformation.

The insulation member 100 has a flat plate shape having an area of the x-y plane larger than the thickness in the z-axis direction. The insulation member 100 has a first surface and a second surface of the x-y plane, and the first surface and the second surface are facing each other in the z-axis direction and respectively form upper and lower surfaces of the insulation member 100.

The insulation member 100 is famed such that the insulation member 100 has a thickness equal to or more than 10 μm and equal to or less than 200 μm. When the thickness of the insulation member 100 is significantly small, the rigidity of the insulation member 100 is so small that there is a risk of damage to the insulation member 100. Furthermore, when the thickness of the insulation member 100 is significantly thick, it is difficult to correspond to a narrow pitch electrode E (illustrated in FIG. 8) of the test object 1. Therefore, it is preferable that the thickness of the insulation member 100 is equal to or more than 10 μm and equal to or less than 200 μm.

The test device includes the conductive part 200 having a thickness equal to or less than the thickness of the insulation member 100, the conductive part 200 having a first portion being mounted inside the insulation member 100 and having a second portion being positioned by extending outward to the insulation member 100. The conductive part 200 has at least a portion thereof provided between the first surface and the second surface so that a portion of the conductive part 200 is positioned on a penetration part that extends inward from any one side portion of the insulation member 100, and a remaining portion of the conductive part 200 extends outward from the insulation member 100 so that the remaining portion is connected to the test object 1. Therefore, the test device including the conductive part 200 and the insulation member 100 has a two-dimensional flat plate shape. That is, the shape of the test device in the x-y plane along the z-axis has the same shape along the z-axis.

The conductive part 200 includes a plurality of conductive parts 200. Each conductive part 200 includes a wiring part 210 and a connection part 220. The first portion mounted inside the insulation member 100 constitutes the wiring part 210, and the second portion that extends outside the insulation member 100 constitutes the connection part 220.

The wiring part 210 is a portion provided inside the insulation member 100, and the connection part 220 is a portion provided outside the insulation member 100 and is connected to the test object 1. The wiring part 210 and the connection part 220 are integrally provided with the same thickness in the thickness direction (±z direction).

The connection part 220 includes a base end part 221 connected to the wiring part 210, a tip end part 223 in contact with the test object 1, and an elastic part 225 elastically connecting the base end part 221 and the tip end part 223 to each other so as to displace the tip end part 223.

A first end of the tip end part 223 is connected to the elastic part 225, a second end of the tip end part 223 is formed as a free end, and the second end of the tip end part 223 is in contact with the test object 1. The tip end part 223 is pressed while the tip end part 223 is in contact with the electrode E of the test object 1, and may be displaced by the elastic part 225.

The elastic part 225 is foamed by alternately connecting a plurality of rectilinear parts 225a and a plurality of curved parts 225b to each other. While the elastic part 225 is stretched in the longitudinal direction (±y direction), the elastic part 225 displaces the tip end part 223 and exerts an appropriate contact pressure.

The connection part 220 includes a current pass part 227 having a first end connected to the base end part 221 and having a second end formed as a free end. When the elastic part 225 is in an unpressed state, the current pass part 227 is not in contact with the tip end part 223. Furthermore, when the elastic part 225 is compressed, the current pass part 227 is in contact with the tip end part 223. The current pass part 227 is provided such that the current pass part 227 extends in the longitudinal direction (±y direction) from a first side of the elastic part 225.

The tip end part 223 is provided with a groove part 224 that accommodates a second end of the current pass part 227. When the elastic part 225 is pressed, the groove part 224 is in contact with the current pass part 227 within the groove part 224 while the groove part 224 guides the second end of the current pass part 227. In addition, according to the depth of the groove part 224 and the length of the current pass part 227 that is inserted into the groove part 224, the groove part 224 prevents excessive press deformation of the elastic part 225. In other words, when the second end of the current pass part 227 is in contact with a bottom surface of the groove part 224, an additional rise of the tip end part 223 is prevented, thereby preventing excessive press deformation of the elastic part 225. Therefore, the elastic part 225 is prevented from being damaged by an unintended rise of the tip end part 223.

The current pass part 227 includes a first extension part 227a positioned at a first end of the current pass part 227, a second extension part 227b positioned at the second end of the current pass part 227, and a bending part 227c connecting the first extension part 227a and the second extension part 227b to each other. The first extension part 227a is connected to the base end part 221 and is famed vertically in the longitudinal direction (±y direction). The bending part 227c is formed by being bent toward the elastic part 225 between the first extension part 227a and the second extension part 227b. The second extension part 227b is formed in a continuous manner with the bending part 227c, and is formed vertically in the longitudinal direction (±y direction). The length of the rectilinear part 225a in the elastic part 225 corresponding to the first extension part 227a is formed longer than the length of the rectilinear part 225a in the elastic part 225 corresponding to the second extension part 227b. The second extension part 227b is inserted into the groove part 224 of the tip end part 223. In addition, according to the depth of the groove part 224 and the length of the second extension part 227b that is inserted into the groove part 224, the bending part 227c prevents excessive press defamation of the elastic part 225. In other words, when the bending part 227c is in contact with a protrusion part around the groove part 224, an additional rise of the tip end part 223 is prevented, thereby preventing excessive press deformation of the elastic part 225. Therefore, the elastic part 225 is prevented from being damaged by an unintended rise of the tip end part 223.

In addition, since the tip end part 223 is provided such that the tip end part 223 is eccentric with respect to a reference axis in which the elastic part 225 is stretched, the free end of the tip end part 223 tilts when the elastic part 225 is pressed and deformed, and a scrub operation is pertained on the electrode E of the test object 1. Through this, an insulation film on a surface of the electrode E is removed, thereby improving the reliability of the connection. In addition, by a structure in which the current pass part 227 (more specifically, the second extension part 227b of the current pass part 227) is inserted into the groove part 224 of the tip end part 223, the range of the tilting angle of the tip end part 223 is limited, so that the surface of the electrode E is prevented from being damaged by excessive scrubbing when the scrub operation is performed.

The connection part 220 of the adjacent conductive part 200 includes a first unit connection part 220-1 and a second unit connection part 220-2 that are left and right symmetrical with respect to the y-z plane. The first unit connection part 220-1 and the second unit connection part 220-2 having shapes left and right symmetrical with each other may be formed in pairs as many as the number of test objects to be tested. The first unit connection part 220-1 and the second unit connection part 220-2 are configured as a pair and are connected to first and second electrodes E of the test object 1, and test each test object 1. At this time, the first unit connection part 220-1 is connected to the first electrode E of the test object 1, and the second unit connection part 220-2 is connected to the second electrode E of the test object 1. Here, the first electrode E and the second electrode E may be two electrodes E provided on one test object 1. For example, a micro LED in a flip chip shape is provided with two electrodes E on an upper surface thereof. Here, the first electrode E and the second electrode E may be two electrodes E provided on the upper surface of the micro LED. Therefore, the first unit connection part 220-1 and the second unit connection part 220-2 having the shapes left and right symmetrical with each other may be used to test one micro LED.

A pitch distance between the tip end part 223 of the first unit connection part 220-1 and the tip end part 223 of the second unit connection part 220-2 is smaller than a pitch distance between the base end part 221 of the first unit connection part 220-1 and the base end part 221 of the second unit connection part 220-2. Through this, since tip end parts of first and second connection parts 220a and 220b are configured such that a narrow pitch is provided, the first and second electrodes E may respond to the narrow pitch even if the first and second electrodes E of the test object 1 are configured such that a narrow pitch is provided.

On the basis of the first unit connection part 220-1 and the second unit connection part 220-2, the elastic parts 225 are provided outside the width direction (±x direction), and the current pass parts 227 are provided inside the width direction (±x direction).

The wiring part 210 is provided inside the insulation member 100 and includes a portion inclined in a diagonal shape. The wiring part 210 includes a bonding pad 211 to which a circuit part 400 is bonded. Here, the circuit part 400 may be a Flexible Printed Circuit Board (FPCB). The adjacent bonding pads 211 are spaced apart from each other by a predetermined pitch distance. A pitch distance between the adjacent wiring parts 210 is formed such that a pitch distance at a side of the bonding pads 211 is larger than a pitch distance at a side of the connection parts 220. In other words, the pitch distance of the wiring parts 210 at the side of the connection parts 220 is less than the pitch distance of the wiring parts 210 at the side of the bonding pads 211. As a result, the density of the wiring parts 210 at the side of the connection parts 220 is higher than the density of the wiring parts 210 at the side of the bonding pads 211. Through this, the narrow pitch correspondence of the first and second electrodes E of the test object 1 is capable of being performed, and it is easy to bond the circuit part 400 to the bonding pad 211.

The test device may be configured such that the test device is provided only with one insulation member 100. In this case, the connection part 220 is disposed as a one column. Alternatively, the test device may be configured such that a plurality of insulation members 100 is bonded to each other. In this case, the connection parts 220 are arranged in a plurality of rows and columns. Referring to FIG. 5, in the test device, two insulation members 100 are bonded by a bonding part 30.

Referring to FIG. 5, the test device having a plurality of insulation members 100 includes a first unit member 10, a second unit member 20, and a bonding part 30 bonding the first unit member 10 and the second unit member 20 to each other.

The first unit member 10 includes a first insulation member 100a and a first conductive part 200a. In other words, the first unit member includes the first insulation member 100a having a flat plate shape, a first wiring part 210a provided inside the first insulation member 100a, and the first conductive part 200a which is provided outside the first insulation member 100a and which is integrally provided with the first connection part 220a that is connected to the test object 1. The first insulation member 100a provides the rigidity to the first unit member 10, and is configured such that the plurality of first conductive parts 200a is insulated from each other. Since the first insulation member 100a has the configuration same as the configuration of the insulation member 100 described above, and the first conductive part 200a has the configuration same as the configuration of the conductive part 200 described above, a detailed description will be omitted.

The second unit member 20 includes a second insulation member 100b and a second conductive part 200b. In other words, the second unit member 20 includes the second insulation member 100b having a flat plate shape, a second wiring part 210b provided inside the second insulation member 100b, and the second conductive part 200b which is provided outside the second insulation member 100b and which is integrally provided with the second connection part 220b that is connected to the test object 1. The second insulation member 100b provides the rigidity to the second unit member 20, and is configured such that the plurality of second conductive parts 200b is insulated from each other. Since the second insulation member 100b has the configuration same as the configuration of the insulation member 100 described above, and the second conductive part 200b has the configuration same as the configuration of the conductive part 200 described above, a detailed description will be omitted.

A first circuit part 400a is connected to the first unit member 10, and a second circuit part 400b is connected to the second unit member 20.

The bonding part 30 bonds the first unit member 10 and the second unit member 20 to each other. Since the thickness in the z-direction of the bonding part 30 affects the pitch distance between the first connection part 220a and the second connection part 220b, the thickness in the z-direction of the bonding part 30 is determined by considering the pitch distance between the first connection part 220a and the second connection part 220b. The bonding part 30 may be provided by curing a bonding agent in a liquid state. In addition, the bonding part 30 may be provided such that the bonding part 30 includes a film in a solid state in order to facilitate a thickness adjustment in the z-direction.

The first unit member 10 may be used to test the test object 1 in the first column of the first row, and the second unit member 20 may be used to test the test object 1 in the second column of the second row. Through this, the test object 1 in the two row by two column may be tested at once. Of course, the number of the row and the column is not limited thereto, and the test device may test a plurality of test objects 1 in the m row by the n column (m and n are natural numbers) through the number of bonding of the first and second unit members 10 and 20.

Hereinafter, a modification example of the first embodiment will be described. FIG. 6 is a view illustrating a modification example of the connection part 220 of the test device according to the first embodiment.

The connection part 220 includes a base end part 221 connected to the wiring part 210, a tip end part 223 in contact with the test object 1, and an elastic part 225 elastically connecting the base end part 221 and the tip end part 223 to each other so as to displace the tip end part 223.

A first end of the tip end part 223 is connected to the elastic part 225, a second end of the tip end part 223 is formed as a free end, and the second end of the tip end part 223 is in contact with the test object 1. The tip end part 223 is pressed while the tip end part 223 is in contact with the electrode E of the test object 1, and may be displaced by the elastic part 225.

The elastic part 225 is famed by alternately connecting a plurality of rectilinear parts 225a and a plurality of curved parts 225b to each other. While the elastic part 225 is stretched in the longitudinal direction (±y direction), the elastic part 225 displaces the tip end part 223 and exerts an appropriate contact pressure.

The connection part 220 includes a current pass part 227 having a first end connected to the base end part 221 and having a second end formed as a free end. When the elastic part 225 is in an unpressed state, the current pass part 227 is not in contact with the tip end part 223. Furthermore, when the elastic part 225 is compressed, the current pass part 227 is in contact with the tip end part 223. The current pass part 227 is provided such that the current pass part 227 extends in the longitudinal direction (±y direction) from a first side of the elastic part 225.

The tip end part 223 is provided with a groove part 224 that accommodates a second end of the current pass part 227. When the elastic part 225 is pressed, the groove part 224 is in contact with the current pass part 227 within the groove part 224 while the groove part 224 guides the second end of the current pass part 227. In addition, according to the depth of the groove part 224 and the length of the current pass part 227 that is inserted into the groove part 224, the groove part 224 prevents excessive press deformation of the elastic part 225. In other words, when the second end of the current pass part 227 is in contact with a bottom surface of the groove part 224, an additional rise of the tip end part 223 is prevented, thereby preventing excessive press deformation of the elastic part 225. Therefore, the elastic part 225 is prevented from being damaged by an unintended rise of the tip end part 223.

The current pass part 227 includes a first extension part 227a positioned at a first end of the current pass part 227, a second extension part 227b positioned at the second end of the current pass part 227, and a bending part 227c connecting the first extension part 227a and the second extension part 227b to each other. The first extension part 227a is connected to the base end part 221 and is formed vertically in the longitudinal direction (±y direction). The bending part 227c is formed by being bent toward the elastic part 225 between the first extension part 227a and the second extension part 227b. The second extension part 227b is formed in a continuous manner with the bending part 227c, and is formed vertically in the longitudinal direction (±y direction). The length of the rectilinear part 225a in the elastic part 225 corresponding to the first extension part 227a is formed longer than the length of the rectilinear part 225a in the elastic part 225 corresponding to the second extension part 227b. The second extension part 227b is inserted into the groove part 224 of the tip end part 223. In addition, according to the depth of the groove part 224 and the length of the second extension part 227b that is inserted into the groove part 224, the bending part 227c prevents excessive press defamation of the elastic part 225. In other words, when the bending part 227c is in contact with a protrusion part around the groove part 224, an additional rise of the tip end part 223 is prevented, thereby preventing excessive press deformation of the elastic part 225. Therefore, the elastic part 225 is prevented from being damaged by an unintended rise of the tip end part 223.

In addition, since the tip end part 223 is provided such that the tip end part 223 is eccentric with respect to a reference axis in which the elastic part 225 is stretched, the free end of the tip end part 223 tilts when the elastic part 225 is pressed and deformed, and a scrub operation is performed on the electrode E of the test object 1. Through this, an insulation film on a surface of the electrode E is removed, thereby improving the reliability of the connection. In addition, by a structure in which the current pass part 227 (more specifically, the second extension part 227b of the current pass part 227) is inserted into the groove part 224 of the tip end part 223 and by a structure in which the first extension part 227a extends to an outer wall of the groove part 224, the range of the tilting angle of the tip end part 223 is limited, so that the surface of the electrode E is prevented from being damaged by excessive scrubbing when the scrub operation is performed.

The connection part 220 of the adjacent conductive part 200 includes a first unit connection part 220-1 and a second unit connection part 220-2 that are left and right symmetrical with respect to the y-z plane. The first unit connection part 220-1 and the second unit connection part 220-2 are configured as a pair and are connected to first and second electrodes E of the test object 1, and test each test object 1. At this time, the first unit connection part 220-1 is connected to the first electrode E of the test object 1, and the second unit connection part 220-2 is connected to the second electrode E of the test object 1. A pitch distance between the tip end part 223 of the first unit connection part 220-1 and the tip end part 223 of the second unit connection part 220-2 is smaller than a pitch distance between the base end part 221 of the first unit connection part 220-1 and the base end part 221 of the second unit connection part 220-2. Through this, since tip end parts of first and second connection parts 220a and 220b are configured such that a narrow pitch is provided, the first and second electrodes E may respond to the narrow pitch even if the first and second electrodes E of the test object 1 are configured such that a narrow pitch is provided.

On the basis of the first unit connection part 220-1 and the second unit connection part 220-2, the elastic parts 225 are provided inside the width direction (±x direction), and the current pass parts 227 are provided outside the width direction (±x direction).

In a conventional test device, a mounting member (a guide plate and so on) in which pins are mounted and the pins are separately manufactured, and then the pins are inserted into the mounting member or bonded to a space transformer. Therefore, it is cumbersome to insert the pins manufactured in small sizes into the mounting member individually or to bond the pins to the space transformer individually. In addition, there was a problem that a position error occurring during the process of mounting the pins. In a conventional technology, a process of manufacturing the pins and a process of mounting the pins are performed in separate processes, so that a mold used for manufacturing the pins is not used at all in the process of mounting the pins. As a result, the conventional test device is not suitable as a test device for testing the test object 1 such as the micro LED in which the horizontal size and the vertical size are about 30 μm, the horizontal size and the vertical size of each electrode are about 10 μm, and the pitch distance is about 10 μm.

On the other hand, in the test device according to an exemplary embodiment of the present disclosure, the insulation member 100 is etched so that an inner space 1300 is formed, and the connection part 220 and the wiring part 210 are manufactured at once by a plating process. Furthermore, since the insulation member 100 used for manufacturing the connection part 220 and the wiring part 210 remains in the test device, a position error occurring during inserting or bonding the pins in a conventional manner does not occur and the narrow pitch correspondence of the electrode is capable of being realized. In addition, since the pitch distance of the connection part 220 is formed uniformly, it is possible to minimize bad test due to a position error of the target object 1 with the electrode E during the test.

Particularly, since the insulation member 100 may be formed of an anodic oxide film material, the rigidity of the insulation member 100 is secured in supporting the conductive part 200, and a position deviation due to a temperature change is minimized due to a low thermal expansion rate.

In addition, the electrodes disposed in the plurality of rows and columns are capable of being tested at once by bonding the plurality of unit members in the flat plate shapes, and the pitch correspondence between adjacent test objects is capable of being realized by the thickness of the bonding part 30, so that a test of the test object 1 disposed in the m row by the n column is capable of being performed.

Second Embodiment

Next, a second embodiment according to the present disclosure will be described. It should be noted that in describing embodiments below, characteristic elements in comparison with the first embodiment will be mainly described, and description of the same or similar elements to those in the first embodiment will be omitted.

Figure 7:
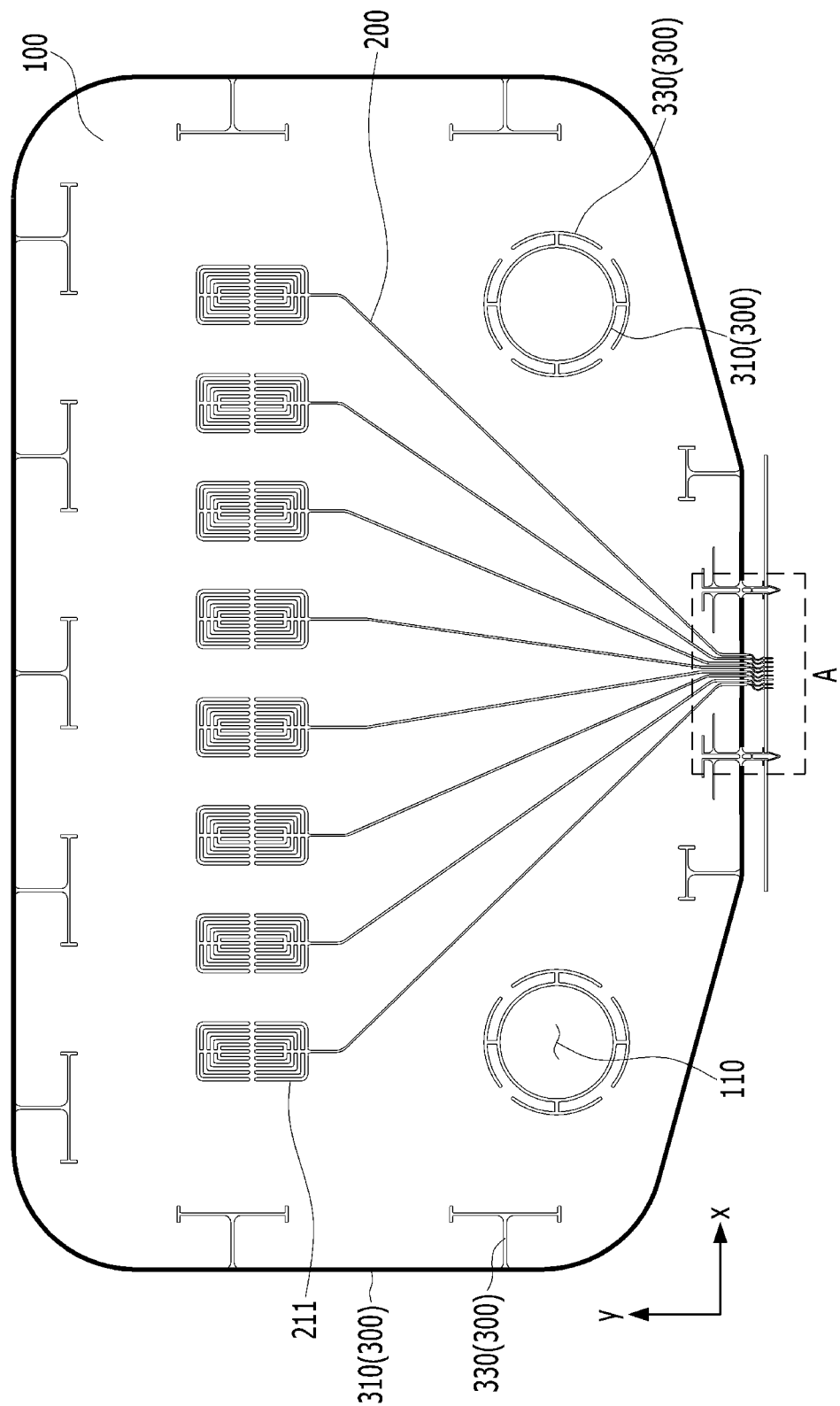
FIG. 7 is a plan view illustrating the test device according to an exemplary second embodiment of the present disclosure.
Figure 8:
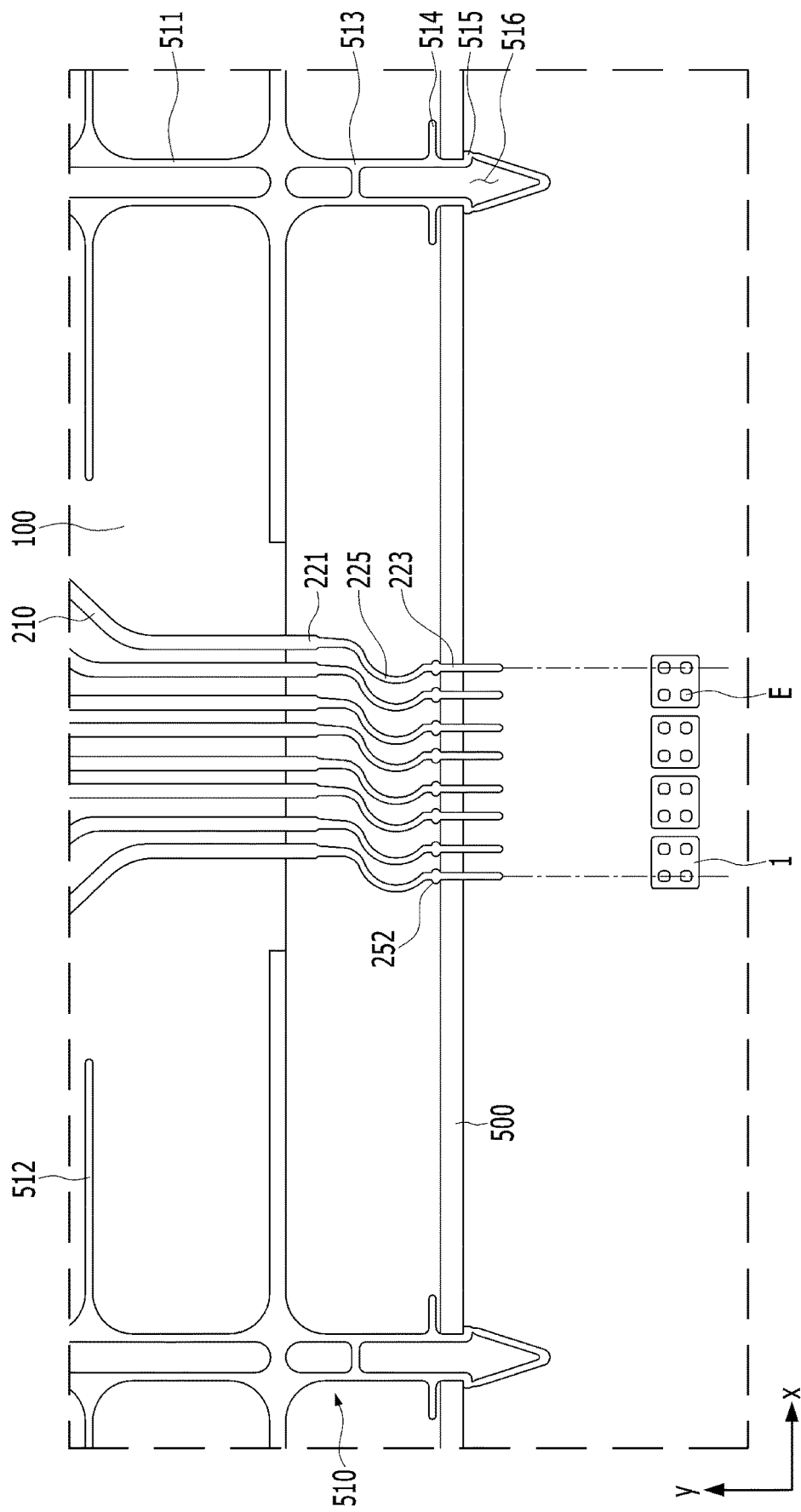
FIG. 8 is an enlarged view illustrating a portion A in FIG. 7.

FIG. 7 is a plan view illustrating the test device according to a second exemplary embodiment of the present disclosure, and FIG. 8 is an enlarged view illustrating a portion A in FIG. 7.

The test device includes an insulation member 100 and a conductive part 200. Here, since the insulation member 100 has a configuration same as the configuration of the insulation member 100 of the test device according to the first embodiment, a detailed description will be omitted.

Each conductive part 200 includes a wiring part 210 and a connection part 220.

The wiring part 210 is a portion provided inside the insulation member 100, and the connection part 220 is a portion provided outside the insulation member 100 and is connected to the test object 1. The wiring part 210 and the connection part 220 are integrally provided with the same thickness in the thickness direction (±z direction).

The connection part 220 includes a base end part 221 connected to the wiring part 210, a tip end part 223 in contact with the test object 1, and an elastic part 225 elastically connecting the base end part 221 and the tip end part 223 to each other so as to displace the tip end part 223.

The elastic part 225 is formed such that the elastic part 225 has a shape curved in the width direction (±x direction). While the elastic part 225 is stretched in the longitudinal direction (±y direction), the elastic part 225 displaces the tip end part 223 and exerts an appropriate contact pressure.

A first end of the tip end part 223 is connected to the elastic part 225, a second end of the tip end part 223 is formed as a free end, and the second end of the tip end part 223 is in contact with the test object 1. The tip end part 223 is pressed while the tip end part 223 is in contact with the electrode E of the test object 1, and may be displaced by the elastic part 225.

The tip end part 223 is famed in a rectilinear shape, and the tip end part 223 is inserted into a guide plate 500. The guide member 500 is engaged and coupled to a fixing part 510 and is supported.

An engagement part 252 is provided at an upper side of the tip end part 223 or a lower side of the elastic part 225. Since the size of the engagement part 252 is larger than the hole of the guide member 500 into which the tip end part 223 is inserted, the engagement part 252 serves to align the position of the tip end parts 223 to a predetermined position. Each tip end part 223 is inserted into each hole of the guide member 500 and is supported by the engagement part 252, so that each end part protrudes from the guide member 500 and is exposed.

By a configuration in which the connection part 220 is provided with the engagement part 252, the position of the end parts of the plurality of tip end parts 223 is capable of being aligned to the predetermined position. Furthermore, by maintaining a deformation direction of the elastic part 225 to be in a predetermined deformation direction, adjacent connection parts 220 are capable of being prevented from contacting each other.

The fixing part 510 includes an inner body 511 provided inside the insulation member 100, and includes an outer body 513 provided outside the insulation member 100.

The inner body 511 includes a plurality of ribs 512, and each rib 512 extends in at least one direction from inside the insulation member 100 and serves to fix the fixing part 510 to the insulation member 100 and reinforces the rigidity of the insulation member 100.

The outer body 513 is a portion that fixes the guide member 500, and is exposed to the outside of the insulation member 100. The outer body 513 includes an upper jaw 514 where an upper surface of the guide member 500 is capable of being in contact with, and a lower jaw 515 where a lower surface of the guide member 500 is capable of being in contact with. Since a portion around the hole of the guide member 500 is positioned between the upper jaw 514 and the lower jaw 515, the guide member 500 is fixed to the fixing part 510. A hollow part 516 is provided in the outer body 513, so that the outer body 513 is capable of being elastically deformed in the width direction (±x direction).

The fixing part 510 is formed of a metal material. When the fixing part 510 is formed of a material same as a material of the conductive part 200, the fixing part 510 is formed together when the conductive part 200 is fainted by the plating process. Through this, since there is no manufacturing error between the fixing part 510 and the conductive part 200, the constant pitch of the connection part 220 of the plurality of conductive parts 200 is capable of being realized. Meanwhile, when the fixing part 510 is formed of a material different from a material of the conductive part 200, a manufacturing error may occur since the plating process is required to be individually performed. However, there is an advantage in that the fixing part 510 is formed of a metal material having a high rigidity, and the conductive part 200 is formed of a metal material having a high electrical conductivity.

A reinforcement part 300 is provided inside the insulation member 100. The reinforcement part 300 is not electrically connected to the conductive part 200, but is provided inside the insulation member 100, thereby reinforcing the strength of the insulation member 100. The reinforcement part 300 is formed of a metal material. When the reinforcement part 300 is foamed of a material same as a material of the conductive part 200, the reinforcement part 300 is formed together when the conductive part 200 is formed by the plating process. When the reinforcement part 300 is formed of a material different from a material of the conductive part 200, there is an advantage in that the reinforcement part 300 is foamed of a metal material having a high rigidity, and the conductive part 200 is foiled of a metal material having a high electrical conductivity.

The reinforcement part 300 includes a border reinforcement part 310 formed on a border portion of the insulation member 100, and includes an inner reinforcement part 330 famed on an inner portion of the insulation member 100. The inner reinforcement part 330 is formed by being disconnected from the border reinforcement part 310, or is formed by being integrally connected to the border reinforcement part 310. Through this, the rigidity of the insulation member 100 may be secured.

A hole 110 is provided inside the insulation member 100. The hole 110 may be used for handling of the insulation member 100 and for bonding of the other insulation member 100. The border reinforcement part 310 is formed on an inner surface of the hole 110, and a plurality of inner reinforcement parts 330 is provided by being connected to the border reinforcement part 310. The border reinforcement part 310 formed around the hole 110 is famed in a circular shape, and the inner reinforcement part 330 is formed in an arc shape. Through this, the rigidity of the hole 110 may be secured.

First Manufacturing Method of Test Device

Hereinafter, a first manufacturing method of the test device according to an exemplary embodiment of the present disclosure will be described. FIGS. 9A to 14B are views illustrating a first manufacturing method of the test device according to an exemplary embodiment of the present disclosure.

A first manufacturing method of the test device includes: a process of forming the inner space 1300 by removing a portion of the insulation member 100 having the flat plate shape; a process of foaming the conductive part 200 by foaming a metal layer in the inner space 1300; and a process of exposing a portion of the conductive part 200 by removing a portion of an end portion of the insulation member 100.

The first manufacturing method of the test device may be an exemplary manufacturing method in a test device in which the thickness of the conductive part 200 and the thickness of the insulation member 100 are the same.

First, referring to FIGS. 9A and 9B, FIG. 9A is a plan view illustrating the insulation member 100, and FIG. 9B is a cross-sectional view taken along line A-A' in FIG. 9A.

The insulation member 100 is formed of an insulation material. The insulation material is formed of a patternable material. The patternable material includes a polymer material, a photo-resist material, an anodic aluminum oxidation film material, and so on. Preferably, in consideration of the rigidity of the test device, the insulation member 100 may be formed of an anodic oxide film material in which a base metal is anodized and then the base metal is removed.

A seed layer 1200 is provided at a lower surface of the insulation member 100. The seed layer 1200 is a metal layer used in a subsequent plating process, may be formed of a copper (Cu) material, and may be formed by a deposition method. A supporting substrate 1100 is formed on a lower portion of the insulation member 100, so that the handling ability of the insulation member 100 may be improved.

Next, referring to FIGS. 10A and 10B, FIG. 10A is a plan view illustrating the inner space 1300 formed in FIG. 9A, and FIG. 10B is a cross-sectional view taken along line A-A' in FIG. 10A.

The inner space 1300 may be formed by wet etching the insulation member 100. To this end, a photoresist is provided on an upper surface of the insulation member 100, and after patterning the photoresist, the internal space 1300 is formed as the insulation member 100 in the patterned and open area reacts with an etching solution and then is removed. The seed layer 1200 is exposed to a lower portion of the inner space 1300.

Figures 11A, 11B:
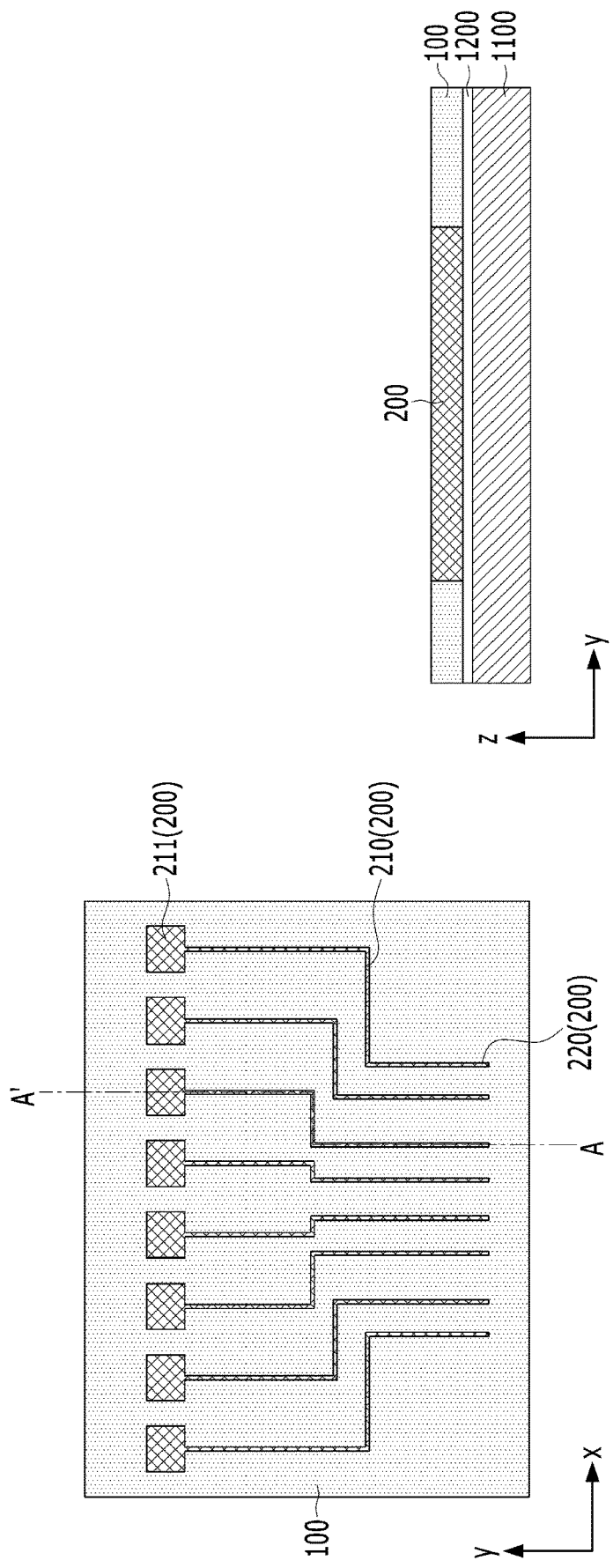

Next, referring to FIGS. 11A and 11B, FIG. 11A is a plan view illustrating a plating process performed in the inner space 1300 in FIG. 10A, and FIG. 11B is a cross-sectional view taken along line A-A' in FIG. 11A.

The conductive part 200 may be formed by a metal such as rhodium (Rd), platinum (Pt), iridium (Ir), palladium (Pd), cobalt (Co), nickel (Ni), manganese (Mn), tungsten (W), phosphorus (Ph), gold (Au), silver (Ag), copper (Cu), or an alloy thereof, or may be formed by a metal selected from a palladium-cobalt (PdCo) alloy, a palladium-nickel (PdNi) alloy, a nickel-phosphorus (NiPh) alloy, a nickel-manganese (NiMn) alloy, a nickel-cobalt (NiCo) alloy, and a nickel-tungsten (NiW) alloy.

Meanwhile, the conductive part 200 may be famed by stacking a plurality of metal layers having materials different from each other by including a first metal layer and a second metal layer. The first metal layer may be formed by a metal such as rhodium (Rd), platinum (Pt), iridium (Ir), palladium (Pd), cobalt (Co), nickel (Ni), manganese (Mn), tungsten (W), phosphorus (Ph), or an alloy thereof, or may be formed by a metal selected from a palladium-cobalt (PdCo) alloy, a palladium-nickel (PdNi) alloy, a nickel-phosphorus (NiPh) alloy, a nickel-manganese (NiMn) alloy, a nickel-cobalt (NiCo) alloy, and a nickel-tungsten (NiW) alloy. The second metal layer may be formed by a metal selected from gold (Au), silver (Ag), copper (Cu), or an alloy thereof.

When the first metal layer and the second metal layer of the conductive part 200 are provided by being alternately stacked, the first metal layer having high abrasion resistance is positioned on a surface side, and the second metal layer having high electrical conductivity is positioned between the first metal layers. The conductive part 200 may be provided in a form in which the first metal layer, the second metal layer, and the first metal layer are sequentially stacked. Preferably, the number of layers is at least three. For example, the conductive part 200 may be provided such that a palladium-cobalt (PdCo) alloy—copper (Cu)—a palladium-cobalt (PdCo) alloy are stacked, a palladium cobalt (PdCo) alloy—copper (Cu) rhodium (Rd) are stacked, or a palladium-cobalt (PdCo) alloy—copper (Cu)—a palladium-cobalt (PdCo) alloy—gold (Au)—a palladium-cobalt (PdCo) alloy are a stacked.

When the plating process is completed, a planarization process is performed by using a CMP process.

Figures 12A, 12B:
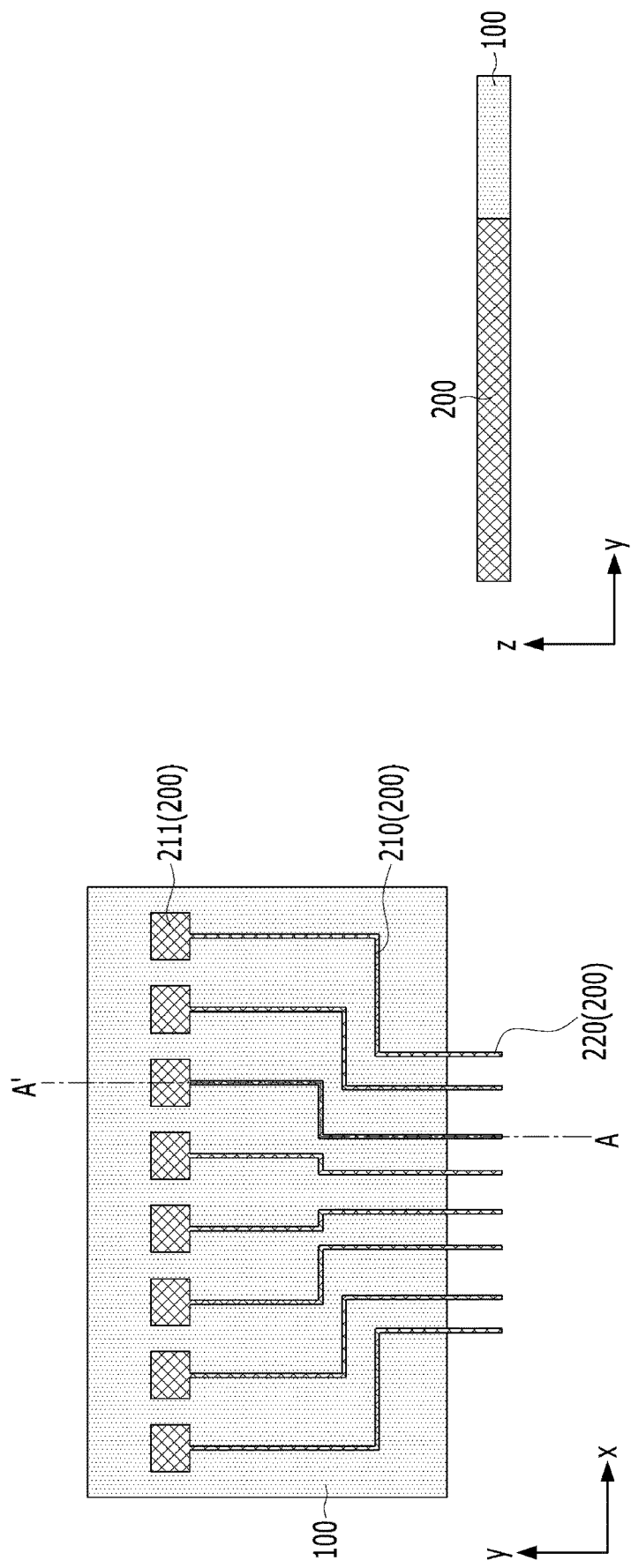

Next, referring to FIGS. 12A and 12B, FIG. 12A is a plan view illustrating a portion of the conductive part 200 exposed to the outside of the insulation member 100 in FIG. 11A, and FIG. 12B is a cross-sectional view taken along line A-A' in FIG. 12A.

By removing one side portion of the insulation member 100, a portion of the conductive part 200 is exposed to the outside of the insulation member 100. A process of removing the portion of the insulation member 100 may be performed by wet etching using a solution that reacts to the anodic oxide film. In this case, in the process before or after the wet etching, the seed layer 1200 and the supporting substrate 1100 are removed. The portion exposed to the outside of the insulation member 100 corresponds to the connection part 220 of the conductive part 200. A unit substrate is completed by removing the seed layer 1200 and the supporting substrate 1100.

Next, referring to FIGS. 13A and 13B, FIG. 13A is a plan view illustrating a combination of two unit substrates 10 and 20 manufactured in FIG. 11A with the bonding part 30 interposed therebetween, and FIG. 13B is a cross-sectional view taken along line A-A' in FIG. 13A.

By using the bonding part 30 so as to bond the two unit substrates 10 and 20 manufactured in the previous process to each other, the connection part 220 is disposed in a form of two rows by two columns.

Next, referring to FIGS. 14A and 14B, FIG. 14A is a plan view illustrating an attachment of the circuit part 400 in FIG. 13A, and FIG. 14B is a cross-sectional view taken along line A-A' in FIG. 14A. The circuit part 400 may be a flexible printed circuit board, and the circuit part 400 is attached to the bonding pad 211 of the wiring part 210. Therefore, the manufacturing of the test device according to the first manufacturing method is completed.

Second Manufacturing Method of Test Device

Hereinafter, a second manufacturing method of the test device according to an exemplary embodiment of the present disclosure will be described. FIGS. 15A to 23B are views illustrating a second manufacturing method of the test device according to an exemplary embodiment of the present disclosure.

A second manufacturing method of the test device includes: a process of forming the inner space 1300 by removing a portion of the insulation member 100 having the flat plate shape; a process of forming the conductive part 200 by forming a metal layer in the inner space 1300; and a process of exposing a portion of the conductive part 200 by removing a portion of an end portion of the insulation member 100.

The second manufacturing method of the test device may be an exemplary manufacturing method in a test device in which the thickness of the conductive part 200 is smaller than the thickness of the insulation member 100.

Figure 15A:
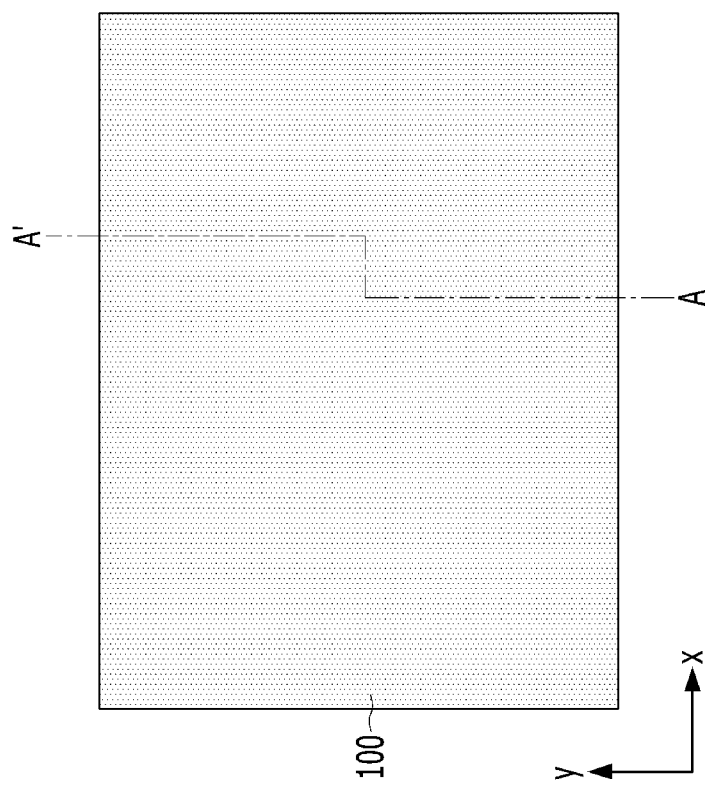
Figure 15B:
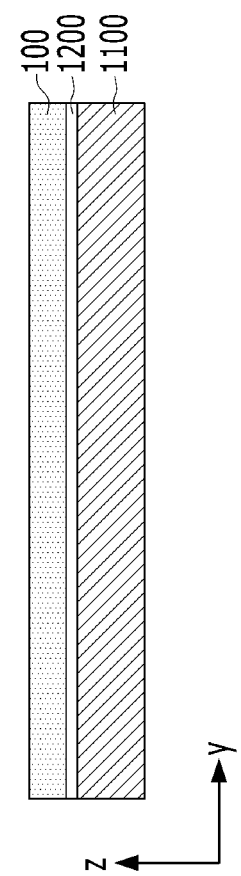

First, referring to FIGS. 15A and 15B, FIG. 15A is a plan view illustrating the insulation member 100, and FIG. 15B is a cross-sectional view taken along line A-A' in FIG. 15A.

The insulation member 100 is formed of an insulation material. The insulation material is formed of a patternable material. The patternable material includes a photoresist and an anodic oxide film. Preferably, the insulation member 100 may be famed of an anodic oxide film material in which a base metal is anodized and then the base metal is removed.

A seed layer 1200 is provided at a lower surface of the insulation member 100. The seed layer 1200 is a metal layer used in a subsequent plating process, may be formed of a copper (Cu) material, and may be formed by a deposition method. A supporting substrate 1100 is formed on a lower portion of the insulation member 100, so that the handling ability of the insulation member 100 may be improved.

Next, referring to FIGS. 16A and 16B, FIG. 16A is a plan view illustrating the inner space 1300 formed in FIG. 15A, and FIG. 16B is a cross-sectional view taken along line A-A' in FIG. 16A.

The inner space 1300 may be formed by wet etching the insulation member 100. To this end, a photoresist is provided on an upper surface of the insulation member 100, and after patterning the photoresist, the internal space 1300 is formed as the insulation member 100 in the patterned and open area reacts with an etching solution and then is removed. The seed layer 1200 is exposed to a lower portion of the inner space 1300.

Figures 17A, 17B:
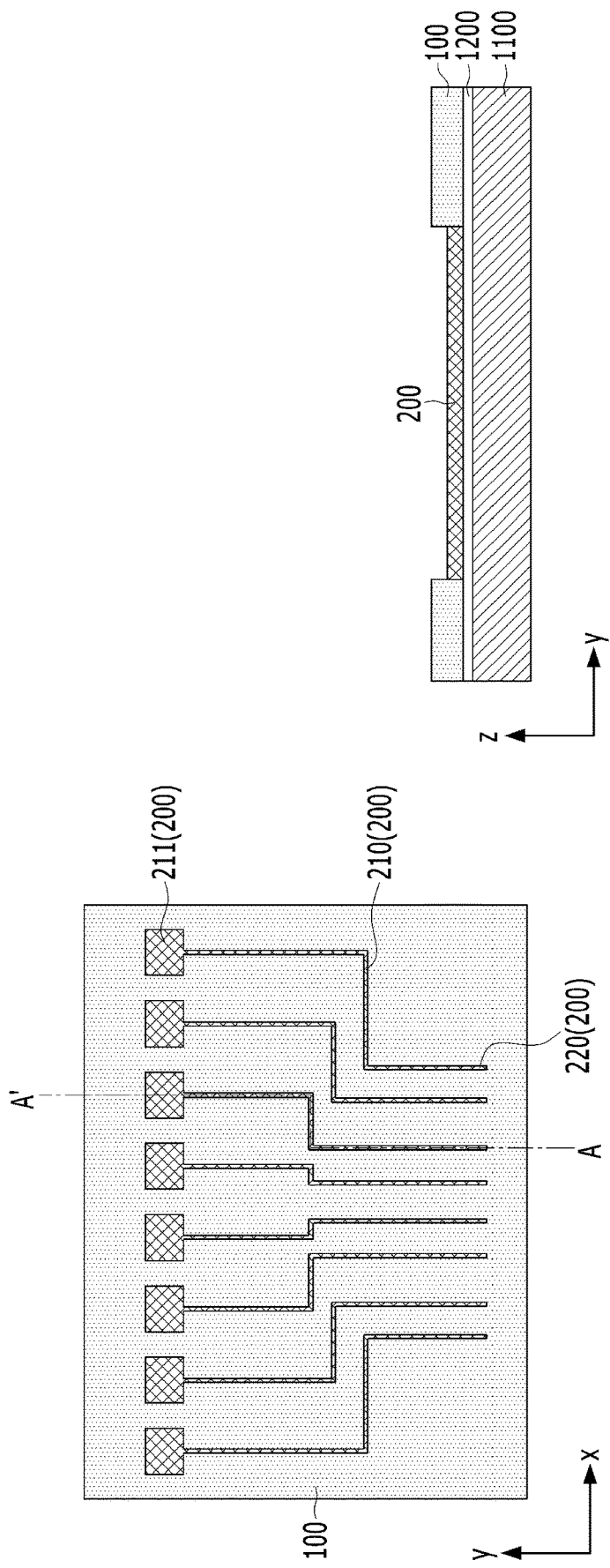

Next, referring to FIGS. 17A and 17B, FIG. 17A is a plan view illustrating a plating process performed in the inner space 1300 in FIG. 16A, and FIG. 17B is a cross-sectional view taken along line A-A' in FIG. 17A.

The plating thickness of the conductive part 200 is smaller than the thickness of the insulation member 100.

The conductive part 200 may be famed by a metal such as rhodium (Rd), platinum (Pt), iridium (Ir), palladium (Pd), cobalt (Co), nickel (Ni), manganese (Mn), tungsten (W), phosphorus (Ph), gold (Au), silver (Ag), copper (Cu), or an alloy thereof, or may be famed by a metal selected from a palladium-cobalt (PdCo) alloy, a palladium-nickel (PdNi) alloy, a nickel-phosphorus (NiPh) alloy, a nickel-manganese (NiMn) alloy, a nickel-cobalt (NiCo) alloy, and a nickel-tungsten (NiW) alloy.

Figure 18B:
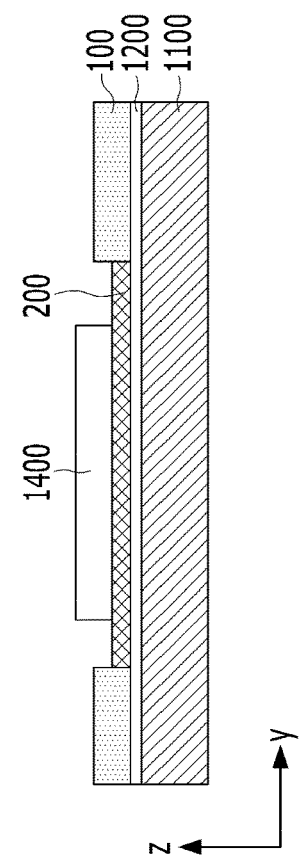
Figure 18A:
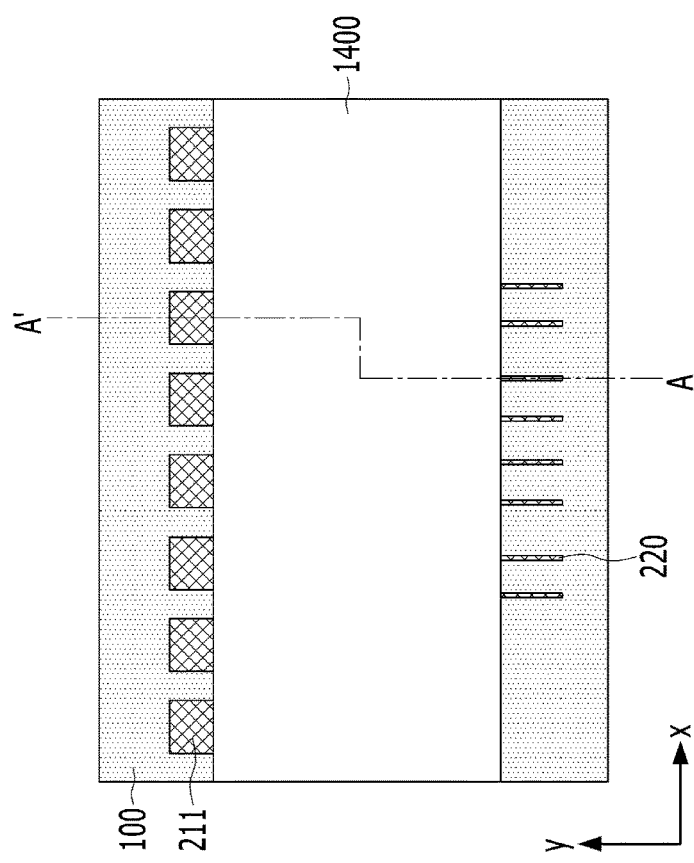

Next, referring to FIGS. 18A and 18B, FIG. 18A is a plan view illustrating a formation of a patterned insulation layer 1400 in FIG. 17A, and FIG. 18B is a cross-sectional view taken along line A-A' in FIG. 18A.

After the insulation layer 1400 is formed on an upper surface of the insulation member 100, the insulation layer 1400 is pattered such that a portion of the conductive part 200 corresponding to the connection part 220 and a portion of the conductive part 200 corresponding to the bonding pad 211 are exposed to the upper side. The insulation member 100 and the conductive part 200 are present on a lower portion of the patterned insulation layer 1400.

Figure 19B:
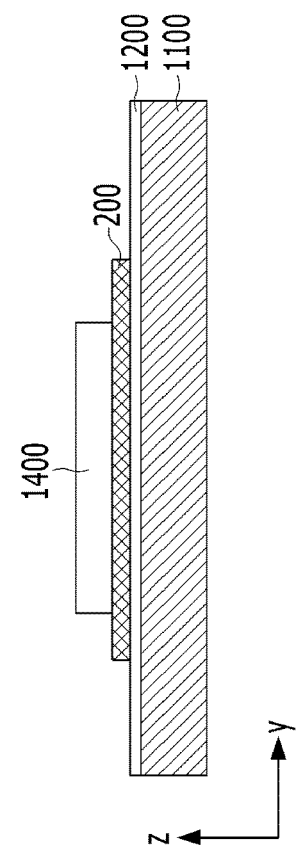
Figure 19A:
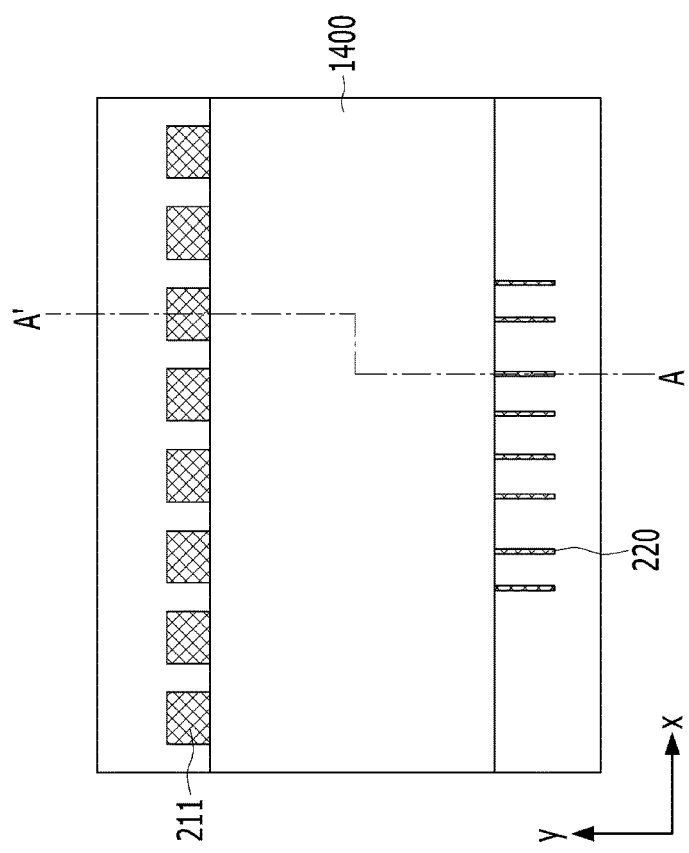

Next, referring to FIGS. 19A and 19B, FIG. 19A is a plan view illustrating a state in which the insulation member 100 in a region that does not have the insulation layer 1400 is removed, and FIG. 19B is a cross-sectional view taken along line A-A' in FIG. 19A.

The insulation member 100 in a region that does not have the insulation layer 1400 is removed by wet etching. Through this, the connection part 220 is exposed from the insulation member 100, and the bonding pad 211 is also exposed from the insulation member 100.

Next, referring to FIGS. 20A and 20B, FIG. 20A is a plan view illustrating an attachment of the circuit part 400 in FIG. 19A, and FIG. 20B is a cross-sectional view taken along line A-A' in FIG. 20A.

The circuit part 400 may be a flexible printed circuit board, and the circuit part 400 is attached to the bonding pad 211 of the wiring part 210.

Next, referring to FIGS. 21A and 21B, FIG. 21A is a plan view illustrating a state in which the seed layer 1200 and the supporting substrate 1100 are removed in FIG. 20A, and FIG. 21B is a cross-sectional view taken along line A-A' in FIG. 21A.

A unit substrate is completed by removing the seed layer 1200 and the supporting substrate 1100.

Figure 22B:
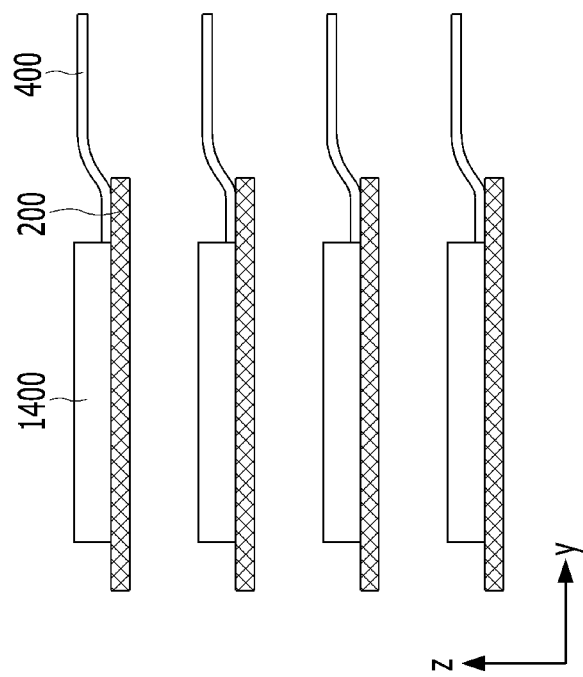
Figure 22A:
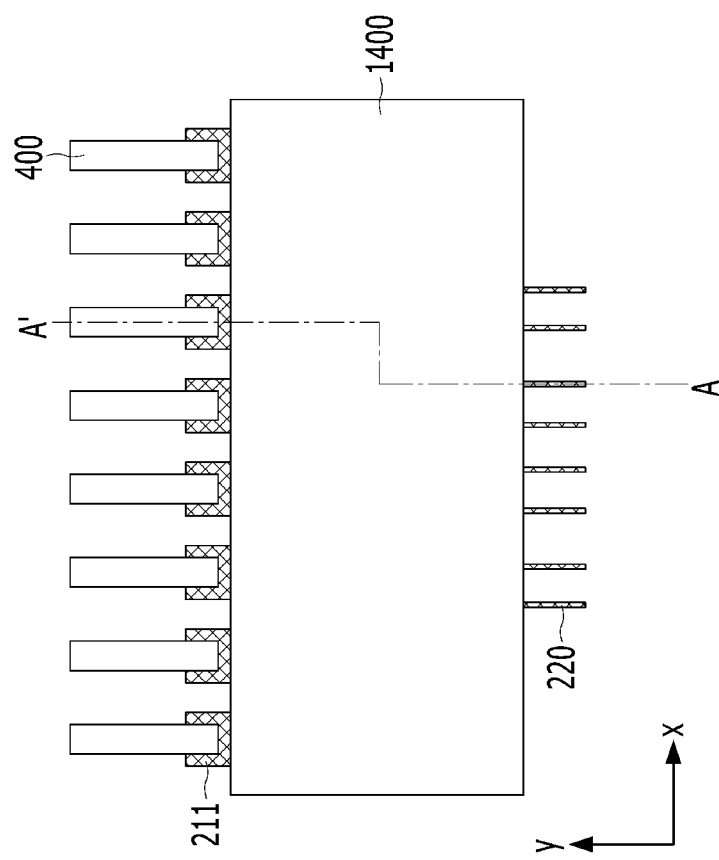

Next, referring to FIGS. 22A and 22B, FIG. 22A is a plan view illustrating several unit substrates, and FIG. 22B is a cross-sectional view taken along line A-A' in FIG. 22A. Several unit substrates for bonding with each other are provided.

Figure 23B:
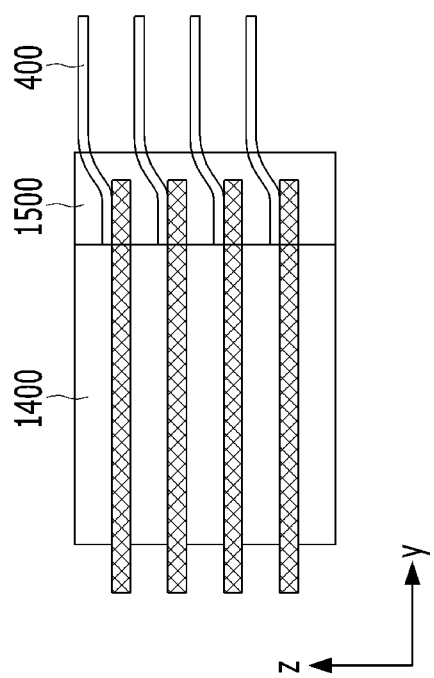
Figure 23A:
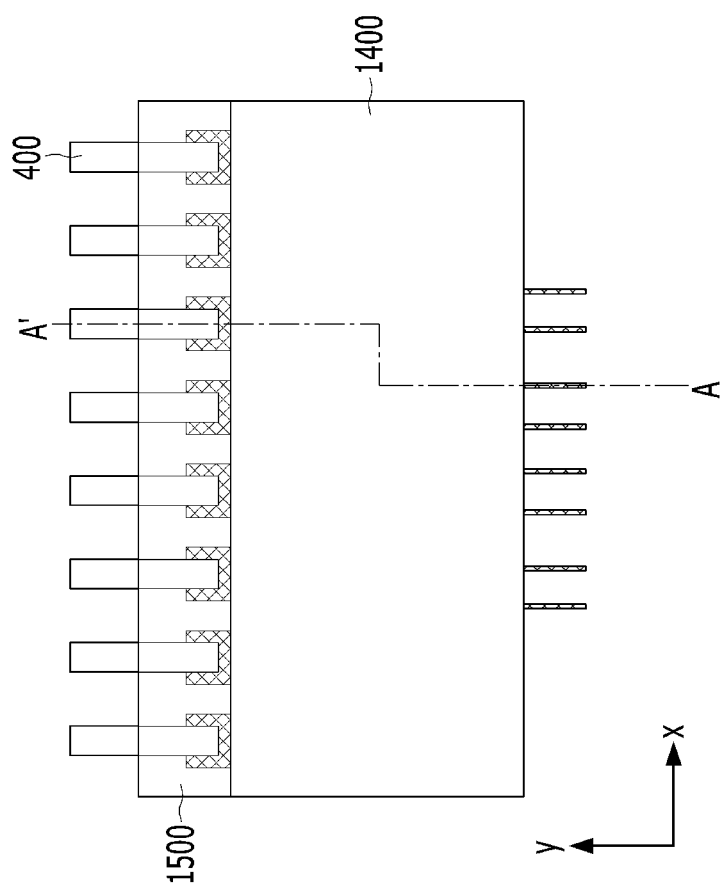

Next, referring to FIGS. 23A and 23B, FIG. 23A is a plan view illustrating a state in which the several unit substrates are bonded with each other, and FIG. 23B is a cross-sectional view taken along line A-A' in FIG. 23A.

The several unit substrates are bonded with each other and form the test device. The insulation layer 1400 may be formed of a material having an insulation function and a bonding function at the same time, thereby allowing the several unit substrates to be bonded with each other in a stacked state. After the several unit substrates are bonded with each other, the circuit part 400 bonded to the bonding pad 211 is molded by using a molding part 1500. Therefore, the manufacturing of the test device according to the second manufacturing method is completed.

Next, referring to FIGS. 12A and 12B, FIG. 12A is a plan view illustrating a portion of the conductive part 200 exposed to the outside of the insulation member 100 in FIG. 11A, and FIG. 12B is a cross-sectional view taken along line A-A' in FIG. 12A.

By removing one side portion of the insulation member 100, a portion of the conductive part 200 is exposed to the outside of the insulation member 100. A process of removing the portion of the insulation member 100 may be performed by wet etching using a solution that reacts to the anodic oxide film. In this case, in the process before or after the wet etching, the seed layer 1200 and the supporting substrate 1100 are removed. The portion exposed to the outside of the insulation member 100 corresponds to the connection part 220 of the conductive part 200.

Next, referring to FIGS. 13A and 13B, FIG. 13A is a plan view illustrating a combination of two unit substrates 10 and 20 manufactured in FIG. 11A with the bonding part 30 interposed therebetween, and FIG. 13B is a cross-sectional view taken along line A-A' in FIG. 13A.

By using the bonding part 30 so as to bond the insulation members 100 provided with the conductive parts 200 manufactured in the previous process to each other, the connection part 220 is disposed in a form of two rows by two columns.

Next, referring to FIGS. 14A and 14B, FIG. 14A is a plan view illustrating an attachment of the circuit part 400 in FIG. 13A, and FIG. 14B is a cross-sectional view taken along line A-A' in FIG. 14A. The circuit part 400 may be a flexible printed circuit board, and the circuit part 400 is attached to the bonding pad 211 of the wiring part 210. Accordingly, the manufacturing of the test device is completed.

In a conventional test device, a mounting member (a guide plate and so on) in which pins are mounted and the pins are separately manufactured, and then the pins are inserted into or bonded to the mounting member. As a result, there was a problem that inserting the pins manufactured in small sizes into the mounting member or bonding the pins to the space transformer was cumbersome, and there was a problem that a position error occurs during the mounting process. Specifically, the conventional test device is not suitable as a test device for testing the test object 1 such as the micro LED in which the horizontal size and the vertical size are about 30 μm, the horizontal size and the vertical size of each electrode are about 10 μm, and the pitch distance is about 10 μm.

On the other hand, in the test device according to an exemplary embodiment of the present disclosure, the insulation member 100 is etched so that the inner space 1300 is formed, and the connection part 220 and the wiring part 210 are manufactured at once by the plating process, so that a position error occurring during inserting or bonding the pins in a conventional manner does not occur and the narrow pitch correspondence of the electrode is capable of being realized. In addition, since the pitch distance of the connection part 220 is famed uniformly, it is possible to minimize bad test due to a position error of the target object 1 with the electrode E during the test.

Particularly, since the insulation member 100 may be formed of an anodic oxide film material, the rigidity of the insulation member 100 is secured in supporting the conductive part 200, and a position deviation due to a temperature change is minimized due to a low thermal expansion rate.

In addition, by bonding the plurality of unit members in the flat plate shapes, it is possible to test electrodes disposed in a plurality of rows and columns at once.

Figure 24:
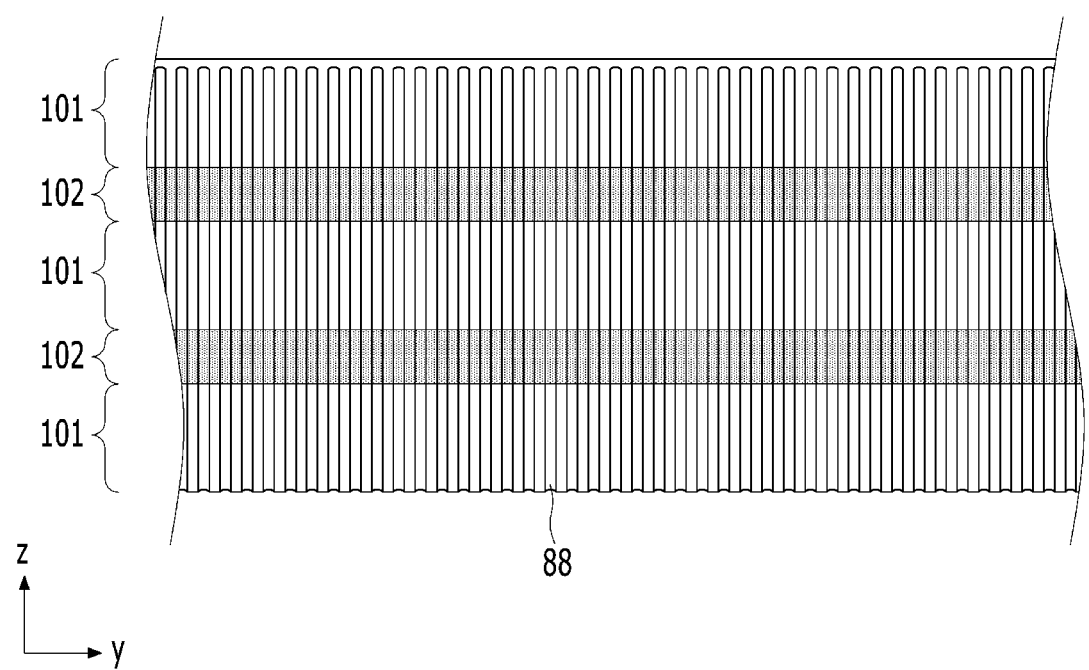
FIG. 24 is a view illustrating a side surface of the connection part of the test device according to an exemplary embodiment of the present disclosure.

Referring to FIG. 24, the conductive part 200 may be formed by stacking a plurality of metal layers having materials different from each other by including a first metal layer 101 and a second metal layer 102. The first metal layer 101 may be formed by a metal such as rhodium (Rd), platinum (Pt), iridium (Ir), palladium (Pd), cobalt (Co), nickel (Ni), manganese (Mn), tungsten (W), phosphorus (Ph), or an alloy thereof, or may be formed by a metal selected from a palladium-cobalt (PdCo) alloy, a palladium-nickel (PdNi) alloy, a nickel-phosphorus (NiPh) alloy, a nickel-manganese (NiMh) alloy, a nickel-cobalt (NiCo) alloy, and a nickel-tungsten (NiW) alloy. The second metal layer 102 may be foamed by a metal selected from gold (Au), silver (Ag), copper (Cu), or an alloy thereof.

When the conductive part 200 is provided such that the first metal layer 101 and the second metal layer 102 are alternately stacked, the first metal layer 101 having high abrasion resistance is positioned on a surface side, and the second metal layer 102 having high electrical conductivity is positioned between the first metal layers 101. The conductive part 200 may be provided in a form in which the first metal layer 101, the second metal layer 102, and the first metal layer 101 are sequentially stacked. Preferably, the number of layers is at least three. For example, the conductive part 200 may be provided such that a palladium-cobalt (PdCo) alloy—copper (Cu)—a palladium-cobalt (PdCo) alloy are stacked, a palladium cobalt (PdCo) alloy—copper (Cu)—rhodium (Rd) are stacked, or a palladium-cobalt (PdCo) alloy—copper (Cu)—a palladium-cobalt (PdCo) alloy—gold (Au)—a palladium-cobalt (PdCo) alloy are a stacked.

Referring to FIG. 24, the connection part 220 includes a plurality of fine trenches 88 on each side surface of the connection part 220. The fine trench 88 is formed such that the fine trench 88 extends long in the thickness direction (±z direction) of the connection part 220 from the side surface of the connection part 220. Here, the thickness direction (±z direction) of the connection part 220 refers to a direction in which a metal filling material is grown during an electroplating process.

The fine trench 88 has a depth ranging equal to or more than 20 nm and equal to or less than 1 μm, and has a width ranging equal to or more than 20 nm and equal to or less than 1 μm. Here, since the fine trench 88 is foiled by pores that is formed when the insulation member 100 having the anodic oxide film material is manufactured, the width and the depth of the fine trench 88 have values equal to or less than a diameter range of the pores of the insulation member 100 having the anodic oxide film material. The insulation member 100 having the anodic oxide film material includes a number of pores, at least a portion of the insulation member 100 having the anodic oxide film material is etched so that the inner space 1300 is formed, and the conductive part 200 is formed by electroplating the inner space 1300. Therefore, the fine trench 88 is provided on the side surface of the conductive part 200, the fine trench 88 being formed by being in contact with the pores of the insulation member 100 having the anodic oxide film material. Since the connection part 220 is exposed to the outside of the insulation member 100 having the anodic oxide film material by etching and removing the end portion of the insulation member 100 having the anodic oxide film material, the fine trench 88 is provided on the side surface of the connection part 220 that is exposed.

The fine trench 88 as described above has an effect of increasing a surface area on the side surface of the connection part 220. By the configuration of the fine trench 88 foamed on the side surface of the connection part 220, heat generated from the connection part 220 may be rapidly discharged, so that an increase in temperature of the connection part 220 may be suppressed. In addition, by the configuration of the fine trench 88 foamed on the side surface of the connection part 220, the twisting resistance capability may be increased when the connection part 220 is deformed.

Although the present disclosure has been described with reference to preferred embodiments, the preferred embodiments are presented to describe the technical spirit of the present disclosure only for illustrative purposes and those skilled in the art will appreciate that various modifications and changes are possible, without departing from the scope and spirit of the present disclosure.

What is claimed is:

1. A test device comprising:
    an insulation member having a flat plate shape; and
    a conductive part integrally provided with a wiring part that is provided inside the insulation member and with a connection part which is provided outside the insulation member and which is configured to be connected to a test object,
    wherein the insulation member is an anodic oxide film in which a base metal is anodized and then the base metal is removed.

2. The test device of claim 1, wherein a thickness of the conductive part is equal to or less than a thickness of the insulation member.

3. The test device of claim 1, wherein the insulation member is a patternable material.

4. The test device of claim 1, wherein the conductive part is provided such that a plurality of conductive parts is formed, the connection parts of the conductive parts adjacent to each other comprise a first unit connection part and a second unit connection part that are having shapes left and right symmetrical with each other, and a pitch distance between a tip end part of the first unit connection part and a tip end part of the second unit connection part is smaller than a pitch distance between a base end part of the first unit connection part and a base end part of the second unit connection part.

5. The test device of claim 1, wherein the connection part comprises:

a first unit connection part configured to be connected to a first electrode of the test object; and a second unit connection part configured to be connected to a second electrode of the test object, and the first unit connection part and the second unit connection part have shapes left and right symmetrical with each other.

6. The test device of claim 1, wherein the wiring part comprises a bonding pad to which a circuit part is bonded.

7. The test device of claim 1, wherein the conductive part is provided with a plurality of conductive parts, and a pitch distance of the wiring parts at a side of the connection part is smaller than a pitch distance of the wiring parts at a side of a bonding pad.

8. The test device of claim 1, wherein the insulation member has a thickness of equal to or more than 10 µm and equal to or less than 200 µm.

9. A test device comprising:
at least one insulation member having a flat plate shape in which an area of an x-y plane is larger than a thickness in a z direction; and
at least one conductive part having a thickness equal to or less than the thickness of the insulation member, the conductive part having a first portion mounted inside the insulation member and having a second portion that is positioned by extending outward to the insulation member,
wherein the at least one insulation member is a plurality of insulation members, and the at least one conductive part is a plurality of conductive part;
wherein the test device is configured such that the plurality of insulation member is bonded to each other by a bonding part; and
wherein a thickness in the z direction of the bonding part affects a pitch distance between a plurality of conductive parts.

10. A test device comprising:
at least one insulation member having a flat plate shape that has a first surface of an x-y plane and a second surface of the x-y plane facing the first surface; and
at least one conductive part having at least a portion provided between the first surface and the second surface such that the portion is positioned on a penetration part that extends inward from any one side portion of the insulation member, the conductive part having a remaining portion positioned by extending outward to the insulation member and being configured to be connected to a test object,
wherein the at least one insulation member is a plurality of insulation members, and the at least one conductive part is a plurality of conductive part;
wherein the test device is configured such that the plurality of insulation members is bonded to each other by a bonding part; and
wherein a thickness in a z direction of the bonding part affects a pitch distance between the plurality of conductive parts.

* * * * *